(12) United States Patent
Sicilia et al.

(10) Patent No.: US 6,921,259 B2
(45) Date of Patent: Jul. 26, 2005

(54) VALVE PIN GUIDE FOR A VALVE-GATED NOZZLE

(75) Inventors: Rob Sicilia, Etobicoke (CA); Denis Babin, Georgetown (CA)

(73) Assignee: Mold-Masters Limited, Georgetown (CA)

(*) Notice: Subject to any disclaimer, the term of this patent is extended or adjusted under 35 U.S.C. 154(b) by 189 days.

(21) Appl. No.: 10/369,564

(22) Filed: Feb. 21, 2003

(65) Prior Publication Data

US 2003/0170340 A1 Sep. 11, 2003

Related U.S. Application Data

(60) Provisional application No. 60/357,859, filed on Feb. 21, 2002.

(51) Int. Cl.[7] .............................................. B29C 45/23
(52) U.S. Cl. ....................................... 425/562; 425/564
(58) Field of Search .......................... 425/549, 562–564

(56) References Cited

U.S. PATENT DOCUMENTS

| | | |
|---|---|---|
| 2,865,050 A | 12/1958 | Strauss |
| 3,488,810 A | 1/1970 | Gellert |
| 3,716,318 A | 2/1973 | Erik et al. |
| 3,741,704 A | 6/1973 | Beasley |
| 3,952,927 A | 4/1976 | Schaumburg et al. |
| 4,004,871 A | 1/1977 | Hardy |
| 4,010,903 A | 3/1977 | Sakuri et al. |
| 4,013,393 A | 3/1977 | Gellert |
| 4,043,740 A | 8/1977 | Gellert |
| 4,173,448 A | 11/1979 | Rees et al. |
| 4,306,852 A | 12/1981 | Mateev et al. |
| 4,368,028 A | 1/1983 | Grish et al. |
| 4,412,807 A | 11/1983 | York |
| 4,652,230 A | 3/1987 | Osuna-Diaz |
| 4,768,283 A | 9/1988 | Gellert |
| 4,768,945 A | 9/1988 | Schmidt et al. |
| 4,771,164 A | 9/1988 | Gellert |
| 4,781,572 A | 11/1988 | Boring |
| 4,832,593 A | 5/1989 | Brown |

(Continued)

FOREIGN PATENT DOCUMENTS

| | | |
|---|---|---|
| DE | 3245571 | 6/1984 |
| DE | 19608676 C1 | 1/1997 |
| DE | 29602484 U | 3/1997 |

(Continued)

OTHER PUBLICATIONS

Ewikon product catalogue and product illustration.
Kunststoffe 85 (1995) 2 p. 166 "NadelverschluBdüsen für kurze Zykluszeit".
"Mold Hotrunner Solutions" Product Illustration of a Guided Mechanism.
"Kona Bushing for Sprueless Molding" pp. 2–24.
PCT Search Report for WO 03/70446 (Application No. PCT/CA03/00244), dated May 16, 2003.
Images and information from "Gunther Hot Runner Technology" taken from Gunther website Aug. 2003.
Press Release entitled "Mold–Masters Introduces The New Accu–Gate Virtually Eliminating Gate Wear" (Dec. 12, 2002).

*Primary Examiner*—Tim Heitbrink
(74) *Attorney, Agent, or Firm*—Sterne, Kessler, Goldstein & Fox P.L.L.C.

(57) ABSTRACT

A valve pin guide is provided for guiding a valve pin from a nozzle into a gate of a mold cavity in an injection molding apparatus. The valve pin guide defines a guide aperture therethrough. The guide aperture is adapted to receive and guide the valve pin into alignment with the gate. The valve pin guide is positioned downstream from said nozzle and upstream from said gate.

25 Claims, 19 Drawing Sheets

U.S. PATENT DOCUMENTS

| | | |
|---|---|---|
| 4,875,848 A | 10/1989 | Gellert |
| 4,911,636 A | 3/1990 | Gellert |
| 4,925,384 A | 5/1990 | Manner |
| 4,945,630 A | 8/1990 | Gellert |
| 4,981,431 A | 1/1991 | Schmidt |
| 5,015,170 A | 5/1991 | Gellert |
| 5,028,227 A | 7/1991 | Gellert et al. |
| 5,053,271 A | 10/1991 | Mori et al. |
| 5,208,052 A | 5/1993 | Schmidt et al. |
| 5,254,305 A | 10/1993 | Fernandez et al. |
| 5,299,928 A | 4/1994 | Gellert |
| 5,334,008 A | 8/1994 | Gellert |
| 5,421,716 A | 6/1995 | Gellert |
| 5,443,381 A | 8/1995 | Gellert |
| 5,492,467 A | 2/1996 | Hume et al. |
| 5,501,594 A | 3/1996 | Glozer et al. |
| 5,505,613 A | 4/1996 | Krummenacher |
| 5,545,028 A | 8/1996 | Hume et al. |
| 5,554,395 A | 9/1996 | Hume et al. |
| 5,652,003 A | 7/1997 | Gellert |
| 5,658,604 A | 8/1997 | Gellert et al. |
| 5,686,122 A | 11/1997 | Huntington et al. |
| 5,695,793 A | 12/1997 | Bauer |
| 5,700,499 A | 12/1997 | Bauer |
| 5,707,667 A | 1/1998 | Galt et al. |
| 5,804,228 A | 9/1998 | Kofsman et al. |
| 5,811,140 A | 9/1998 | Manner |
| 5,834,041 A | 11/1998 | Sekine et al. |
| 5,848,343 A | 12/1998 | Takahashi et al. |
| 5,849,343 A | 12/1998 | Gellert et al. |
| 5,879,727 A | 3/1999 | Puri |
| 5,895,669 A | 4/1999 | Seres, Jr. et al. |
| 5,941,837 A | 8/1999 | Amano et al. |
| 6,003,182 A | 12/1999 | Song |
| 6,009,616 A | 1/2000 | Gellert |
| 6,017,209 A | 1/2000 | Gellert et al. |
| 6,030,202 A | 2/2000 | Gellert et al. |
| 6,050,806 A | 4/2000 | Ko |
| 6,089,468 A | 7/2000 | Bouti |
| 6,164,954 A | 12/2000 | Mortazavi et al. |
| 6,227,461 B1 | 5/2001 | Schroeder et al. |
| 6,234,783 B1 * | 5/2001 | Shibata et al. ............ 425/549 |
| 6,245,278 B1 | 6/2001 | Lausenhammer et al. |
| 6,264,460 B1 | 7/2001 | Wright et al. |
| 6,273,706 B1 | 8/2001 | Gunther |
| 6,309,208 B1 | 10/2001 | Kazmer et al. |
| 6,358,038 B1 | 3/2002 | Rozenberg |
| 6,358,039 B1 | 3/2002 | Manner et al. |
| 6,419,116 B1 | 7/2002 | Eigler et al. |
| 2003/0008034 A1 | 1/2003 | Niewels |
| 2004/0071817 A1 | 4/2004 | Fischer et al. |

FOREIGN PATENT DOCUMENTS

| | | |
|---|---|---|
| EP | 0638407 | 4/1996 |
| EP | 0750975 | 1/1997 |
| EP | 0873841 | 10/1998 |
| EP | 0962296 | 8/2001 |
| EP | 1188537 | 3/2002 |
| FR | 2537497 | 6/1984 |
| JP | 5-177664 | 7/1993 |
| JP | 05309695 A | 11/1993 |
| JP | 05261770 A | 12/1993 |
| JP | 07148786 A | 6/1995 |
| JP | 8090598 | 4/1996 |
| JP | 10264222 A | 10/1998 |
| JP | 10-296798 | 11/1998 |
| JP | 11254488 A | 9/1999 |
| JP | 2002-307492 | 10/2002 |
| JP | 2003-11173 | 1/2003 |
| JP | 2003-11174 | 1/2003 |
| JP | 2003-11176 | 1/2003 |
| WO | WO 84/00922 | 3/1984 |
| WO | WO 01/078961 | 10/2001 |
| WO | WO 03/004243 A1 | 1/2003 |
| WO | WO 03/070446 A1 | 8/2003 |
| WO | WO 2004/012923 A2 | 2/2004 |

* cited by examiner

VALVE PIN GUIDE FOR A VALVE-GATED NOZZLE

FIELD OF THE INVENTION

This invention relates to an injection molding apparatus, and more particularly to a guide for a valve pin in a valve-gated nozzle.

BACKGROUND OF THE INVENTION

It is known for a nozzle in a hot runner injection molding apparatus to include a valve pin gating mechanism at each gate into each mold cavity. The valve pin is typically moved in a melt channel of the nozzle towards or away from the gate, to control the flow of melt into the melt cavity. In order to provide a good seal at the gate, both the tip portion of the valve pin and the corresponding sealing surface on the gate must typically be machined to very close tolerances.

When a misaligned valve pin is moved to close a gate, the valve pin collides with the gate and can cause scoring of the sealing surfaces on the valve pin and/or the gate. This can ultimately result in poor quality parts with blemishes around the gate, and can cause other problems with the molding operation. Furthermore, a damaged valve pin or gate can be expensive and time consuming to replace. The damage may happen immediately, or alternatively it may happen gradually, over many cycles of opening and closing the valve pin.

Solutions that have been proposed for this problem, have typically included a guide means positioned towards the bottom of the nozzle melt channel to capture and align the free end of the valve pin. Because melt is required to flow past the alignment means/valve pin interface when the valve pin is in the open position, a plurality of circumferentially spaced slots are typically provided in either the valve pin or the alignment means. In doing so, these slots create the potential for weld lines to appear in the molded product, as a result of the melt flow in the nozzle melt channel separating to pass around the guide means, and subsequently reuniting downstream from the guide means. Furthermore, the presence of such guide means in the nozzle melt channel typically renders more difficult a cleanout of the nozzle melt channel, hampering for example the changeover of a machine to run a new melt.

Other solutions have provided an offset nozzle melt channel which has a main portion that is offset from the center of the nozzle, and a lowermost portion that is aligned with the gate. The valve pin passes through the nozzle body and extends only into the lowermost portion of the nozzle melt channel. In this way, the valve pin is captured along a substantial portion of its length, which makes it less susceptible to misalignment. However, because a substantial portion of the nozzle melt channel is offset from the center of the nozzle, the heat distributed to the melt flowing therethrough is uneven, which can cause difficulties in controlling melt temperature. Reference is made to U.S. Pat. No. 5,834,041 (Sekine et al) and U.S. Pat. No. 5,895,669 (Seres, Jr et al), which disclose embodiments of this genre of proposed solution.

Other problems also exist, which originate from the manufacture of the nozzles themselves instead from the properties of the melt flow. Manufacturing errors may exist in the nozzles, which can introduce a misalignment between the valve pin and the gate that is 'built-in'. The guide means that are described above, which are built into the nozzle itself, do nothing to correct this particular cause of misalignment.

Thus, a need exists for a nozzle having an improved guide for guiding the valve pin into the gate.

SUMMARY OF THE INVENTION

In a first aspect the invention is directed to a valve pin guide for guiding a valve pin from a nozzle into a gate of a mold cavity in an injection molding apparatus. The valve pin guide defines a guide aperture therethrough. The guide aperture is adapted to receive and guide the valve pin into alignment with the gate. The valve pin guide is positioned downstream from said nozzle and upstream from said gate.

In a second aspect, the invention is directed to an injection molding apparatus that incorporates at least one of the valve pin guide described above.

In a third aspect, the invention is directed to an injection molding apparatus. The injection molding apparatus includes a mold cavity block, an injection nozzle, a valve pin and a valve pin guide. The mold cavity block defines a mold cavity therein. The mold cavity has a gate. The mold cavity block has a first bore and a second bore. The gate is positioned in the second bore. The first bore is larger in diameter than the second bore. A melt channel is defined in the injection nozzle to convey melt towards the gate. The valve pin is positioned at least partially in the melt channel and is movable to control melt flow into the gate. The valve pin guide is adapted to receive and guide the valve pin into alignment with the gate. The valve pin guide is positioned in the first bore.

BRIEF DESCRIPTION OF THE DRAWINGS

Reference will now be made by way of example to the accompanying drawings, showing articles made according to preferred embodiments of the present invention, in which.

DETAILED DESCRIPTION OF THE INVENTION

Figure 15:
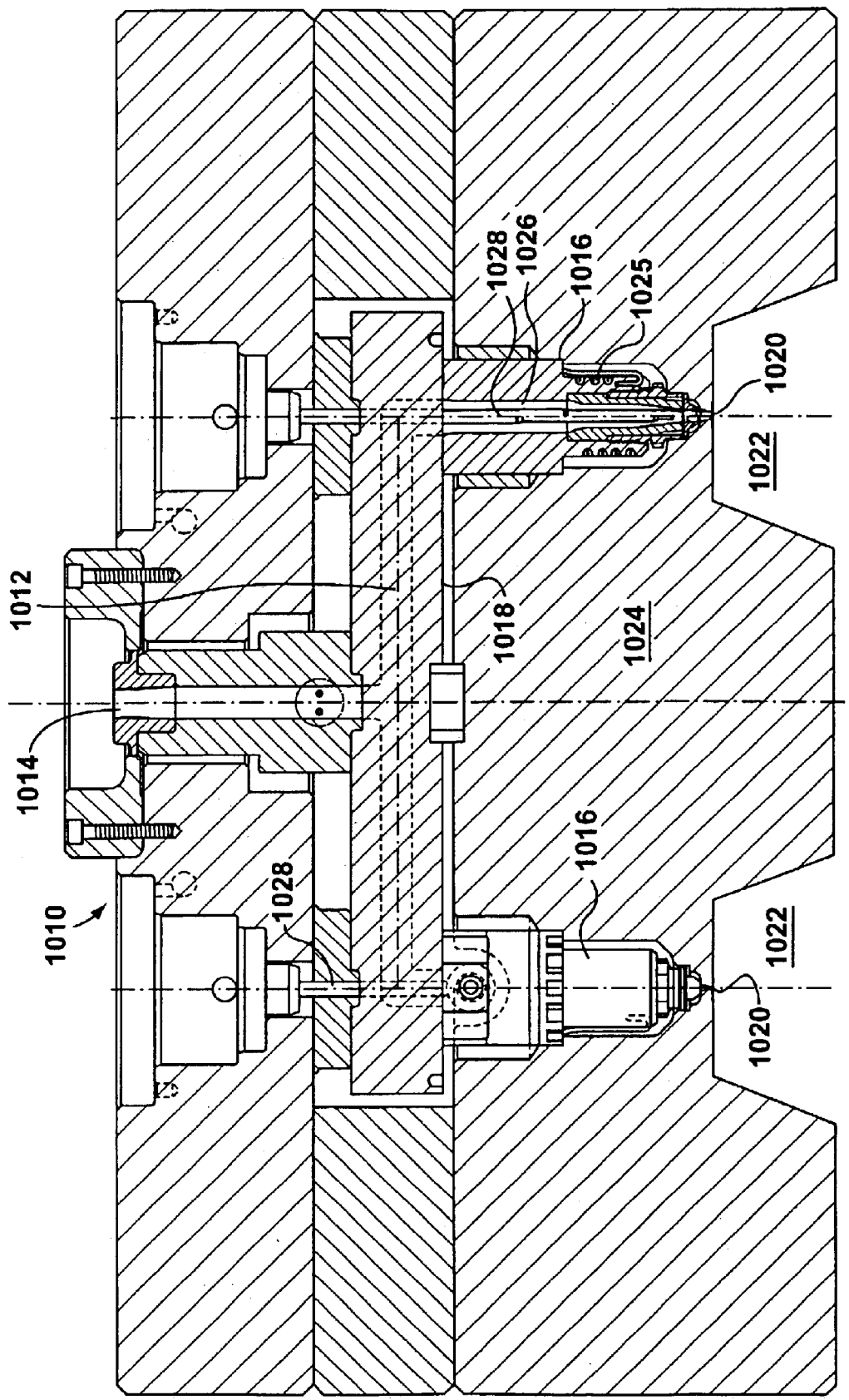
FIG. 15 is a sectional view of an injection molding machine having a plurality of valve pin guiding and alignment systems in accordance with the prior art.

Reference is made to FIG. 15, which shows an injection molding machine 1010 of the prior art. The injection molding machine 1010 includes one or more runners 1012, that transfer melt from an inlet 1014 to one or more nozzles 1016. The runners 1012 are defined within one or more molding machine plates, such as, for example, a manifold 1018. The inlet 1014 is adapted to be fluidly connected to a melt source (not shown).

The nozzles 1016 transfer melt from the runners 1012 through one or more gates 1020 and into one or more mold cavities 1022 defined in a mold plate 1024. A heater 1025 may heat each nozzle 1016. Each nozzle 1016 defines a nozzle melt channel 1026 which is in fluid communication with a runner 1012 and thus, with the melt source.

A valve pin 1028 is movable within each nozzle melt channel 1026 to open and close one of the gates 1020, permitting or restricting the flow of melt into the mold cavity 1022. The configuration of the end portion of the valve pin 1028 and the gate 1020 and their engagement are shown in more detail in FIGS. 16a, 16b, 16c and 16d. The valve pin 1028 typically includes a generally cylindrical body 1030, a cylindrical sealing surface 1031, which is typically on the endmost portion of the body 1030, and an end face 1032. The edge between the end face 1032 and the sealing surface 1031 is shown at 1034 and is typically chamfered to facilitate the introduction of the valve pin 1028 into the gate 1020.

Due to the fact that the end face 1032 and chamfered edge 1034 will ultimately make up a portion of the surface of the mold cavity 1022, there may be design restrictions on the angle of the chamfered edge 1034. For example, the chamfered edge 1034 may be limited to having a relatively shallow angle with respect to the end face 1032 so as to provide a certain shape in the molded part.

The gate 1020 typically includes a cylindrical sealing surface 1036 adjacent the mold cavity 1022, and also includes a chamfered inlet surface 1038. The sealing surface 1036 receives and cooperates with the sealing surface 1031 of the valve pin 1028 to seal the gate 1020 against melt flow into the mold cavity 1022. The chamfered inlet surface 1038 cooperates with the chamfered edge 1034 on the valve pin 1028 to facilitate the introduction of the valve pin 1028 into the gate 1020.

Figure 16A:
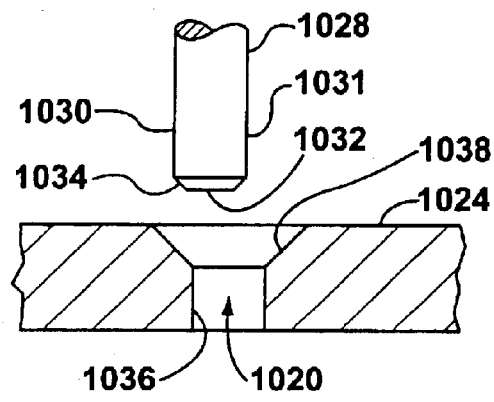
FIGS. 16a, 16b, 16c and 16d are magnified sectional side views showing the operation of a valve pin and mold plate of the prior art.
Figure 16B:
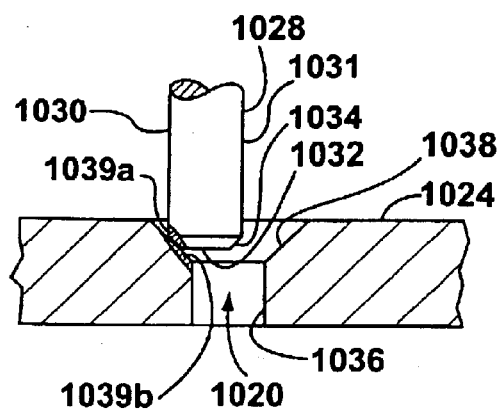
Figure 16C:
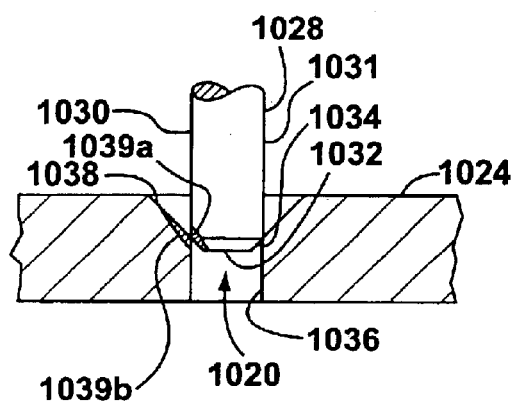
Figure 16D:
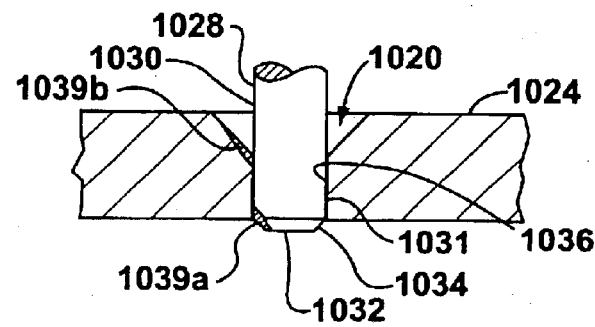

The movement of the valve pin 1028 will now be described. In FIG. 16a, the valve pin 1028 is shown spaced from the gate 1020. The valve pin 1028 may be misaligned with the gate 1020 to any degree. When the valve pin 1028 is moved to close the gate 1020, if there is any misalignment of the valve pin 1028 and gate 1020, the valve pin 1028 first contacts the gate 1020 in the manner shown in FIG. 16b. The first contact is made by the chamfered edge 1034 and the chamfered inlet surface 1038. As the valve pin 1028 moves forward to close the gate 1020, the chamfered edge 1034 slides off the chamfered inlet surface 1038 thereby guiding the valve pin 1028 into alignment with the gate 1020. The valve pin 1028 then moves forwardly in the sealing surface 1036 of the gate 1020, as shown in FIG. 16c until arriving at the 'closed' position, as shown in FIG. 16d. It will be appreciated that the 'closed' position of the valve pin 1028 need not be as shown in FIG. 16d. After a number of molding cycles, the repeated contact between the valve pin 1028 and the inlet surface 1036 of the gate 1020 can eventually result in one or both of the sealing surface 1031 of the valve pin 1028 and the sealing surface 1036 of the gate 1020 being scored, worn away or otherwise damaged.

The portions of the valve pin 1028 and the gate 1020 that can be damaged are shown at 1039a and 1039b respectively. This damage can result in melt leaking past the gate 1020 after the gate 1020 is closed, and can also result in blemishes on the molded part. Thus, depending on the needs of the molding operation, the valve pin 1028 and the gate 1020 may require repair or replacement. It will be noted that the scoring or damage shown at 1039a and 1039b can occur almost immediately, depending on the nature of the molding operation, and thus poor quality parts can result virtually immediately. This problem is exacerbated if the angle of the chamfered edge 1034 on the valve pin 1028 is shallow, because the contact forces between the valve pin 1028 and the gate inlet surface 1038 can further promote wear, scoring or other damage.

Figure 1:
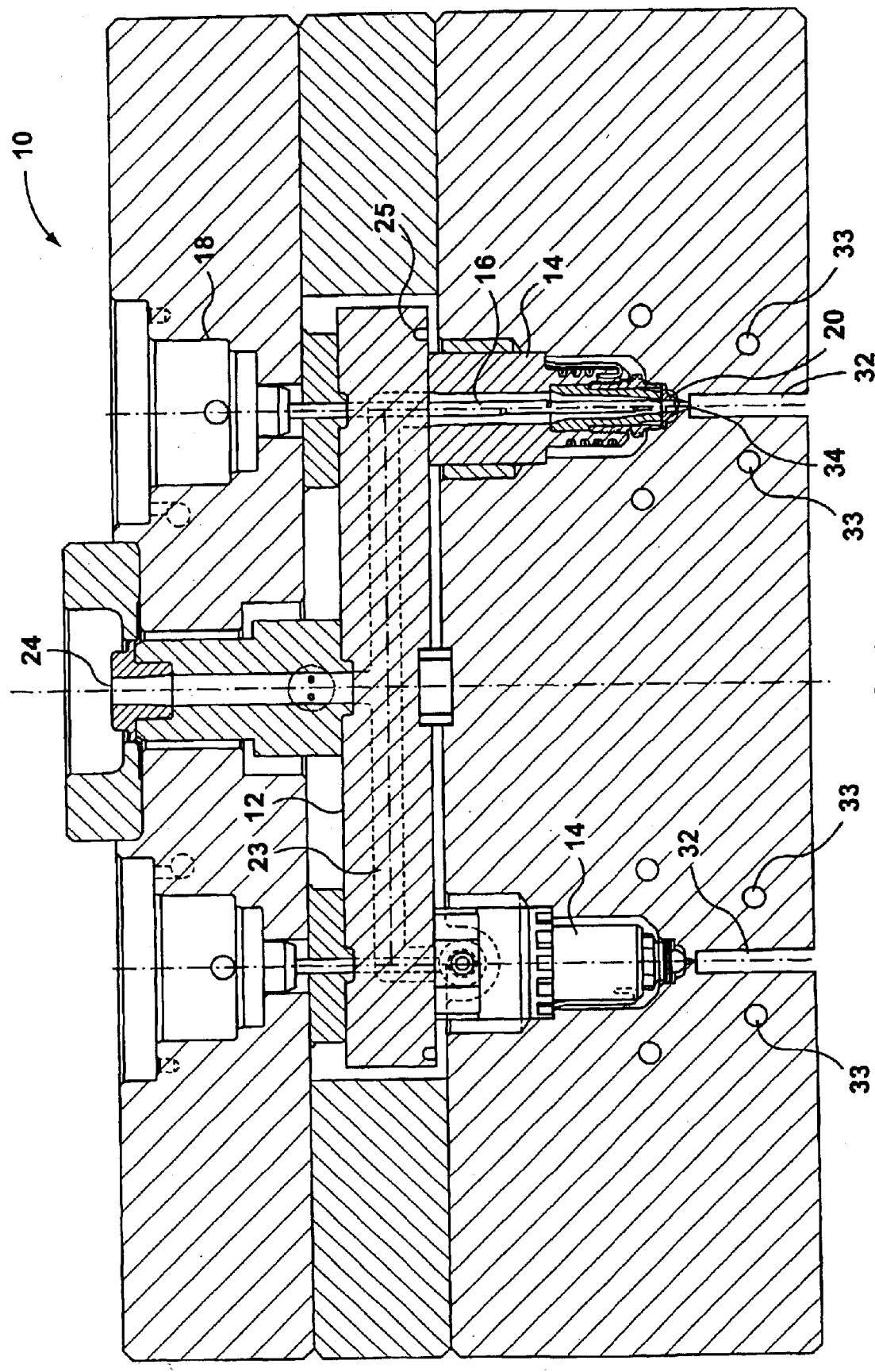
FIG. 1 is a sectional view of an injection molding apparatus having a plurality of valve-gated nozzles and a plurality of valve pin guides in accordance with a first embodiment of the present invention.

Reference is made to FIG. 1, which shows an injection molding apparatus 10, having a manifold 12, a plurality of nozzles 14, valve pins 16, valve pin actuators 18, a plurality of valve pin guides 20 in accordance with a first embodiment of the present invention, and a mold cavity block 22.

Manifold 12 includes a plurality of runners 23 (also known as melt channels), which have an inlet 24, which receives melt from a melt source (not shown), and transport the melt to the nozzles 14. Manifold 12 may be heated by a heater 25.

Figure 2:
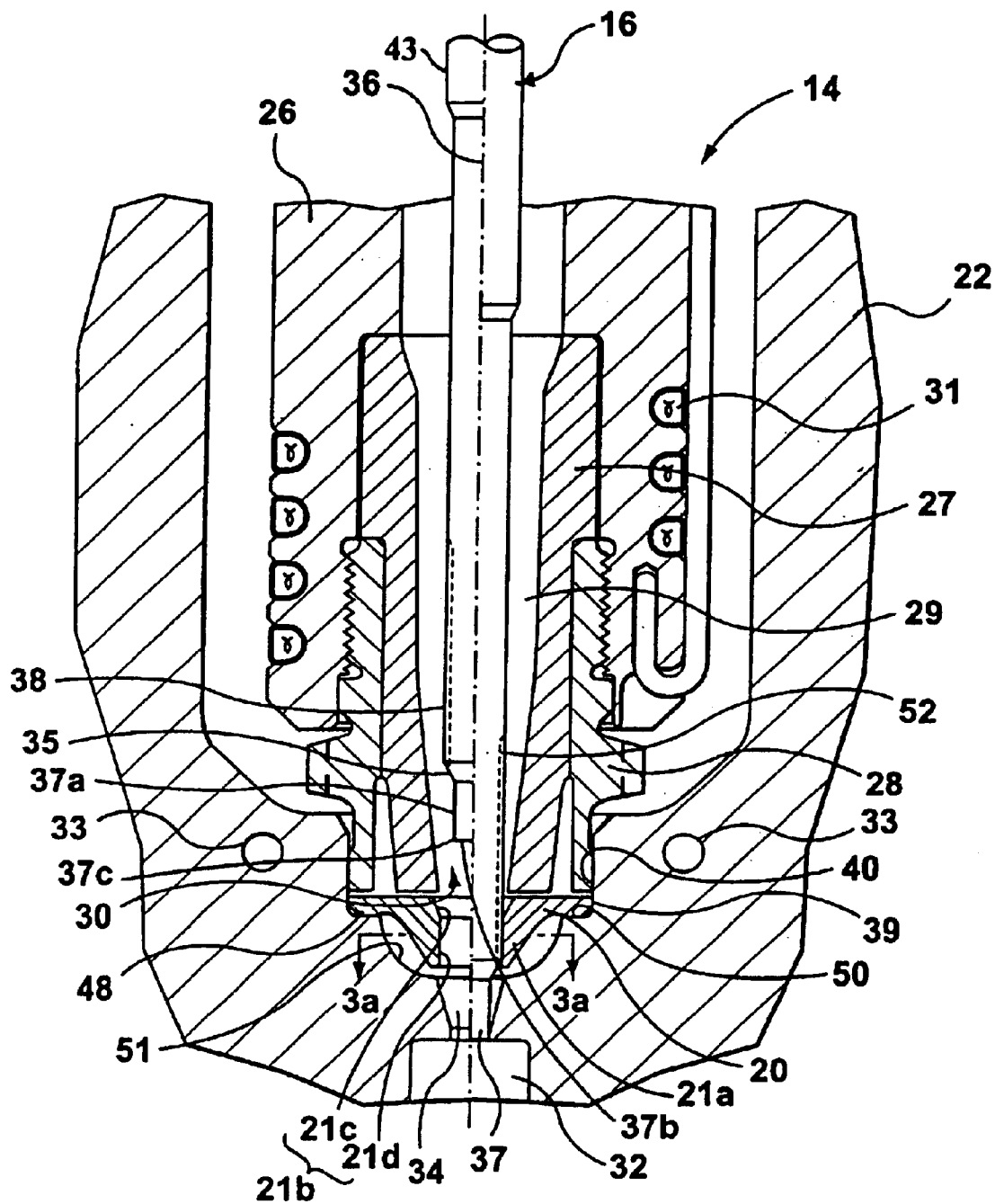
FIG. 2 is a sectional side view of one of the nozzles shown in FIG. 1.

Reference is made to FIG. 2. Each nozzle 14 has a nozzle body 26. The nozzles 14 may have a separate tip 27, and may further have a separate tip retainer 28. The nozzles 14 each have a nozzle melt channel 29 that extends therethrough to transport melt from the manifold 12 to an outlet 30. Each nozzle 14 may have a heater 31, which may be any suitable type of nozzle heater. For example, the heater 31 may be a wrapped wire heater, such as is shown in FIG. 2.

The tip 27 may be made from a thermally conductive material to facilitate the conduction of heat from the heater 31 to any melt flowing through the tip 27. Furthermore, the tip 27 may also be made from a wear-resistant material. For example, the tip 27 may be made from Tungsten Carbide. The tip 27 may alternatively be made from a thermally insulative material to reduce heat transfer out of any melt flowing therethrough.

The tip retainer 28 may further seal against a first bore 40 in the mold cavity block 22. The tip retainer 28 may be made of a thermally insulative material, such as titanium, mold steel, or chrome steel, to reduce heat transfer to the mold cavity block 22.

The mold cavity block 22 has a plurality of mold cavities 32, which may be cooled by a cooling fluid flowing through a plurality of cooling channels 33. Each mold cavity 32 has an inlet 34, which is commonly referred to as a gate 34. An axis 36 extends along the centerline of the gate 34 and the nozzle melt channel 29. The valve pin 16 is generally centered along axis 36, and is movable along axis 36 by the actuator 18, to open and close the gate 34 into the mold cavity 32. The valve pin 16 is shown in the Figures in the open position on the left side of axis 36, and in the closed position on the right side of axis 36.

The valve pin 16 has a body 43 and a tip 37. The tip 37 is sized to mate with the gate 34. When the tip 37 is inserted into the gate 34, a sealing surface 37a on the tip 37 cooperates with the gate 34 to seal against melt flow therebetween into the mold cavity 32. The tip 37 has a bottom face 37b. The bottom face 37b meets the sealing surface 37a along an edge 37c. The edge 37c may be a simple edge (as shown), or may alternatively be chamfered, depending on the specific requirements of the molding operation. It will be appreciated that having a simple edge 37c (ie. having substantially no chamfer on the edge 37c) provides better aesthetics on the molded part that is formed in the mold cavity 32. This is because the unchamfered bottom face 37b can be made to be substantially flush with the surrounding surfaces of the mold cavity 32. By contrast, a chamfered edge cannot be made flush, and will therefore leave a mark of some kind on the molded part, such as an indent or a vestige of some kind.

Upstream from the tip 37, the valve pin 16 may have a guide surface 38, which may have a larger diameter than the tip 37. A shoulder 35, which may be coned, transitions from the guide surface diameter down to the tip diameter. The shoulder 35 and the guide surface 38 are discussed further below.

Each valve pin guide 20 is positioned between one of the nozzles 14 and the mold cavity block 22. The valve pin guide 20 cooperates with the valve pin 16 to align the valve pin 16 with the gate 34. This inhibits damage to the gate 34 upon entry of the valve pin 16 therein.

In the embodiment shown in FIG. 2, the valve pin guide 20 cooperates with the guide surface 38 and the shoulder 35 to align the valve pin 16 with respect to the gate 34. By aligning the valve pin 16 on these surfaces and not on the sealing surface 37a and the bottom face 37b, the sealing surface 37a and the bottom face 37b are at least somewhat protected from wear during entry into the gate 34.

Furthermore, aligning the valve pin 16 on the guide surface 38 and the shoulder 35 permits the use of the unchamfered bottom face 37b, which provides improved aesthetics in the molded parts (not shown).

The valve pin guide 20 may be made, for example, from a single piece. Alternatively, however, the valve pin guide 20 may be made from two or more pieces as is discussed in more detail further below. Each valve pin guide 20 includes a peripheral edge 39 that cooperates with the first bore 40 in the mold cavity block 22 to align the valve pin guide 20 relative to the axis 36. Valve pin guide 20 may fit tightly in the first bore 40, by means of, for example an interference fit, to prevent the inadvertent movement of valve pin guide 20 in the first bore 40. The valve pin guide 20 may be made to be removable and replaceable once it is worn too much to align the valve pin 20 suitably. Thus, the guide 20 may be replaced, saving the time and expense of repairing the gate 34, or replacing the molding apparatus component containing the gate 34.

The valve pin guide 20 has a guide body 21a, which has a guide aperture 21b therethrough, which guides the valve pin 16 for entry into the gate 34. The guide aperture 21b may be centered along the axis 36.

The guide aperture 21b may have an upstream portion 21c and a downstream portion 21d. The upstream portion 21c may be coned to facilitate the insertion of the valve pin 16 therein and to inhibit the valve pin 16 from jamming against the valve pin guide 20 if the tip 37 of the valve pin 16 is offset from the axis 36.

The valve pin guide 20 may optionally have a sealing face 48, which cooperates with a bottom shoulder 50 in the first bore 40 to inhibit melt leakage therebetween. The peripheral edge 39 may also be a sealing face, inhibiting melt leakage between it and the first bore 40. The sealing face 48 and the peripheral edge 39 may seal in any suitable way, such as by a mechanical seal.

A second bore 51 may extend from the bottom shoulder 50 further into the mold cavity block 22. The gate 34 may be positioned in the second bore 51, as shown. The second bore 51 may be concentric with the first bore 40.

The valve pin guide 20 may be made from any suitable material, such as, for example, steel, Tungsten Carbide, Beryllium-Copper, and Tungsten-Zirconium-Molybdenum. Any material from which the tip 27 or the tip retainer 28 are made can be used for the valve pin guide 20. The valve pin guide 20 may be thermally insulative, or thermally conductive, or may be made from more than one material, depending on the requirements of the molding operation. For example, the valve pin guide 20 may include an outer piece made from a thermally insulative material, such as titanium, mold steel, or chrome steel, or Vespel™, and may include an inner piece made from a thermally conductive material, or from a wear-resistant material, such as Tungsten Carbide.

In use, melt flows from a melt source (not shown), through the manifold runners 23, through the nozzle melt channel 29, through aperture 21b, through the gate 34 and into the mold cavity 32. The nozzle 14 is heated by the heater 31, to heat the melt flowing therethrough. As the nozzle 14 is heated, it undergoes thermal expansion, during which time it may or may not contact the valve pin guide 20.

Figure 2A:
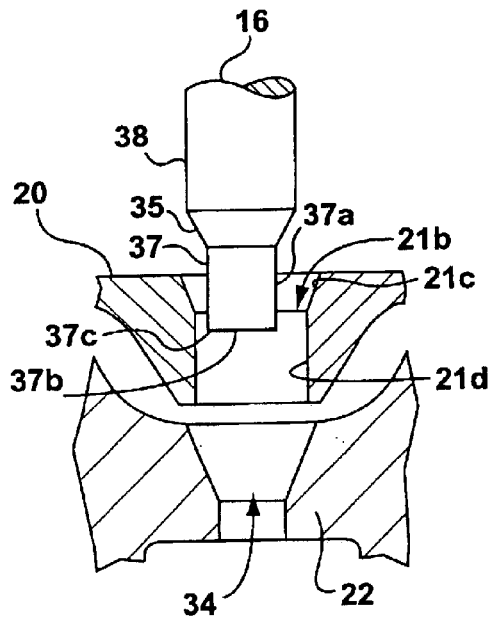
FIGS. 2a, 2b, 2c and 2d are magnified sectional side views of a valve pin guide shown in FIG. 2 aligning a valve pin entering a gate.
Figure 2B:
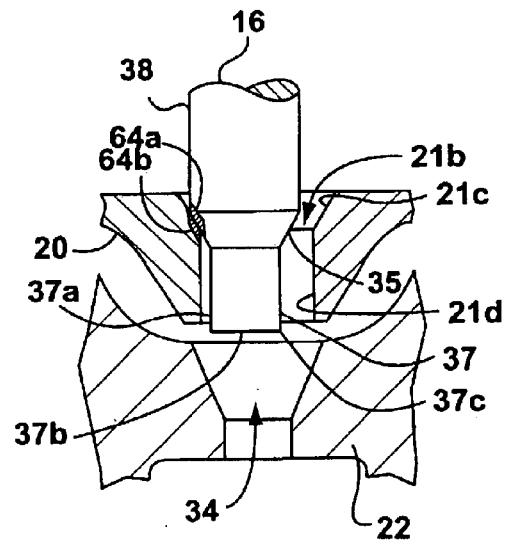
Figure 2C:
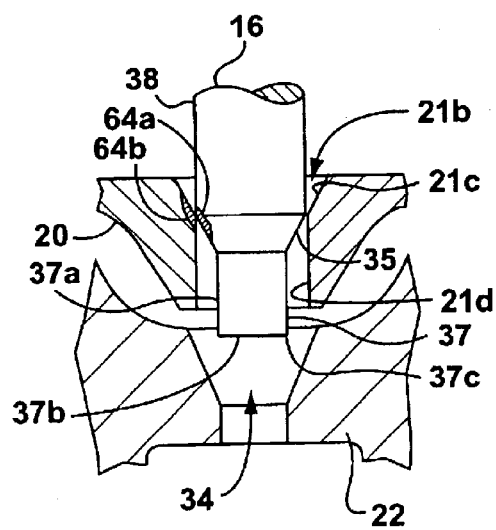
Figure 2D:
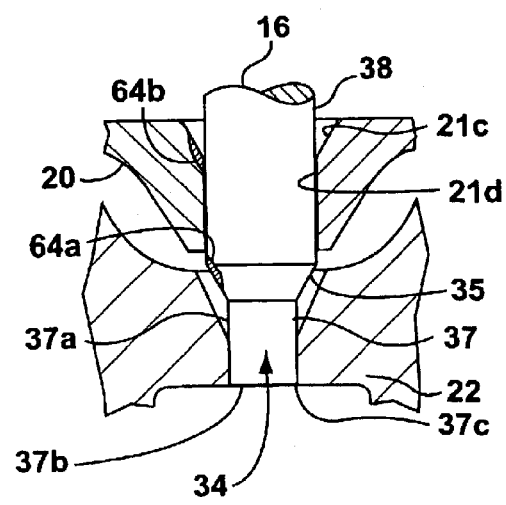
Figure 2E:
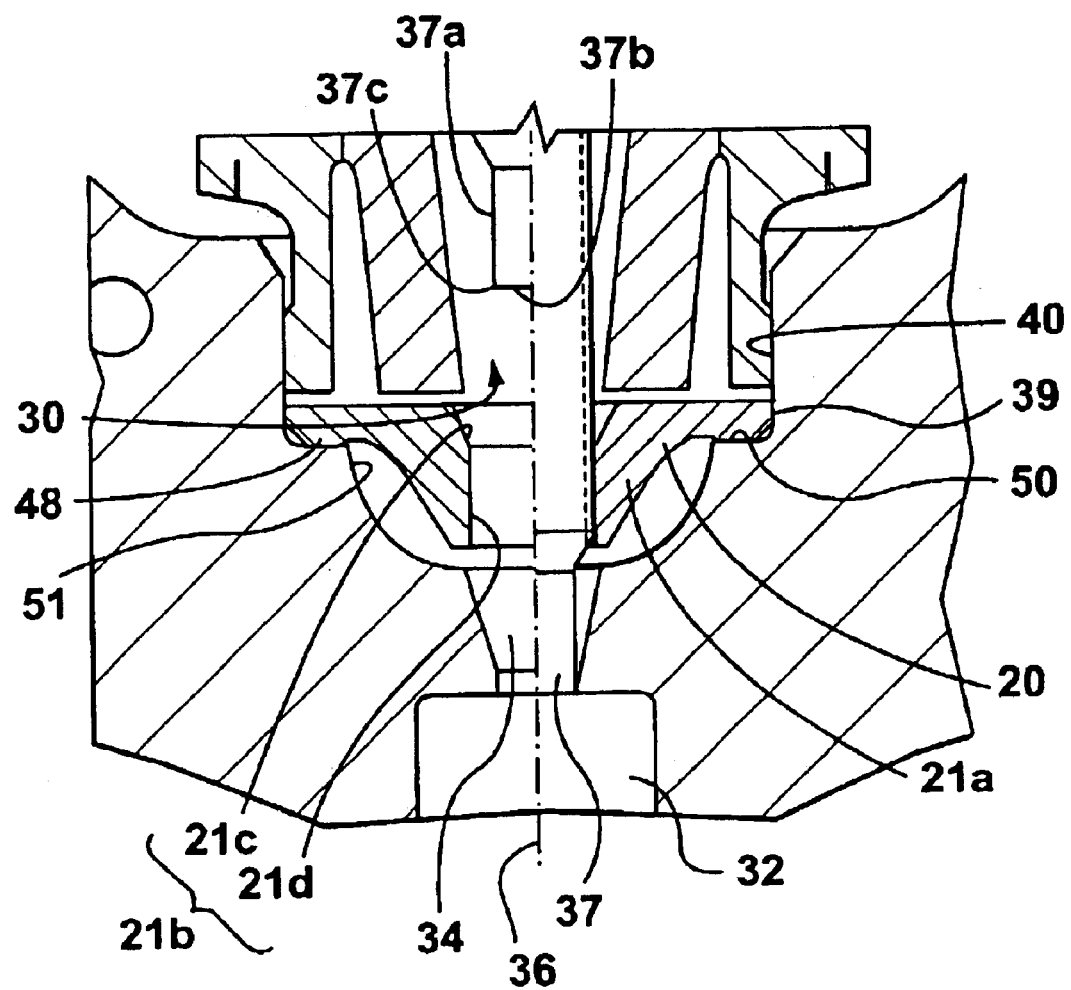
FIG. 2e is a magnified sectional side view of the valve pin guide and a bore in the mold cavity block shown in FIG. 2.

Reference is made to FIG. 2e. In the embodiment shown, melt is permitted to accumulate in the second bore 51 around the valve pin guide 20. The melt can act as a thermal insulator between the valve pin guide 20 and the mold cavity block 22. In an embodiment not shown, it is alternatively possible for the valve pin guide 20 to contact the mold cavity block 22 immediately adjacent the gate 34, so as to form a closed conduit from the guide aperture 21b into the gate 34, and thus prevent melt from leaking into the second bore 51. While this would provide an insulative air gap between substantially all of the guide 20 and the mold cavity block 22, this would provide some heat loss from the guide 20 into the mold cavity 22 proximate the gate 34.

Due to the layout of the runners 23 and other factors, the melt flowing through the nozzle 14 may have varying properties across its cross-section, and may thus push the tip 37 of the valve pin 16 so that it is offset from the axis 36.

As the valve pin 16 is extended by the actuator 18 (FIG. 1), the valve pin guide 20 realigns the tip 37 with the axis 36, so that the tip 37 is suitably aligned prior to contacting the gate 34. Once the valve pin 16 closes the gate 34, the mold cavity block 22 is cooled in order to solidify the melt in the mold cavity 32, thereby forming a molded part (not shown). The mold cavity block 22 is then opened; the molded part is ejected from the mold cavity 32, and the mold cavity block 22 is closed again. The valve pin 16 is withdrawn from the gate 34 and the cycle is started again.

Reference is made to FIGS. 2a, 2b, 2c and 2d, which illustrate the alignment of the valve pin 16 by means of the valve pin guide 20 prior to contact with the gate 34. The shoulder 35 and valve pin guiding surface 38 cooperate with the upstream and downstream portions 21c and 21d of the guide aperture 21b, to bring the valve pin 16 into alignment with the gate 34.

As the valve pin 16 moves from the position shown in FIG. 2a towards the gate 34, if there is any misalignment between the valve pin 16 and the gate 34, the first contact occurs between the valve pin shoulder 35 and the upstream portion 21c, as shown in FIG. 2b.

The shoulder 35 and the upstream portion 21c may be provided with any selected cone angles. The cone angles can be selected to reduce the risk of scoring or otherwise damaging one or both of the valve pin 16 or the valve pin guide 20, upon first contact or upon any subsequent sliding contact.

It will be noted that the valve pin shoulder 35, the valve pin guide surface 38, and the upstream and downstream portions 21c and 21d of the guide aperture 21b are larger in diameter than the valve pin tip 37 and the gate 34. By having the contact and sliding occur on these larger diameter surfaces 35, 38, 21c and 21d, a longer service life can be achieved before requiring repair or replacement of the valve pin 16 and the valve pin guide 20.

One or both of valve pin shoulder 35 and the upstream portion 21c on the guide 20 may be hardened by any suitable surface treatment means, to further reduce the risk of scoring. One of the surfaces 35 and 21c may be selected to be harder than the other, so that the softer of the two may be 'sacrificed' during the repeated contacting and sliding that occurs during an injection molding campaign. The surface 35 or 21c that is selected to be sacrificed may be, for example, on the part that is the less expensive of the two, the easier of the two or the less time consuming of the two to replace.

As the valve pin 16 is moved towards the gate 34, the shoulder 35 and upstream portion 21c of the guide aperture 21b cooperate to bring the valve pin 16 into alignment with the gate 34. Once the shoulder 35 is moved past the upstream portion 21c, the valve pin guiding surface 38 and the downstream portion 21d of the guide aperture 21b contact each other to maintain the valve pin 16 in alignment with the gate 34 (see FIG. 2c). The valve pin 16 is then moved towards and into the gate 34, to close the gate 34, as shown in FIG. 2d.

The valve pin guiding surface 38 and the downstream portion 21d of the guide aperture 21b may be surface treated in a similar way to the shoulder 35 and the upstream portion 21c of the guide aperture 21b and may also include one surface 38 or 21d that is selected to be sacrificial.

It will be noted that, because the valve pin 16 is aligned with the gate 34 before contacting the gate 34, the edge 37c on the valve pin tip 37 is not required. By not chamfering the edge 37c, it is possible to virtually eliminate any mark on the molded part, because the bottom face 37b may be made flush with the interior surface of the mold cavity 32. Nonetheless, a chamfered edge may be included optionally (not shown). The chamfered edge may have any suitable shape as desired to meet the aesthetic requirements of the molded part, with little or no effect on the ability of the valve pin 16 to enter and close the gate 34.

The portions of the components shown in FIGS. 2a–2d that incur wear and damage are shown at 64a and 64b. These portions 64a and 64b are positioned away from the sealing surface 37a and the gate 34. Thus, by incorporating the valve pin guide 20 and the shoulder 35 and the guiding surface 38 on the valve pin 16, the service life of the valve pin 16 may be extended beyond the service life of the valve pin 1028 of the prior art (FIGS. 16a–16d). Furthermore, since damage from misalignment to the gate 34 and optionally to the valve pin sealing surface 37a is reduced or eliminated, a source of blemishes on the molded parts is reduced or eliminated.

It will be appreciated that numerous modifications to the injection molding cycle may be made without departure from the invention. For example, the cooling of the mold cavity block 22 may begin prior to the closure of the gate 34 by the valve pin 16.

Figure 3C:
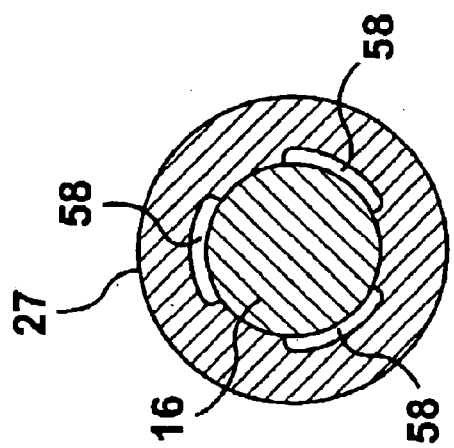
FIG. 3c is a cross-sectional view of a plurality of cutouts that are optionally included on the tip of the nozzle shown in FIG. 2.
Figure 3B:
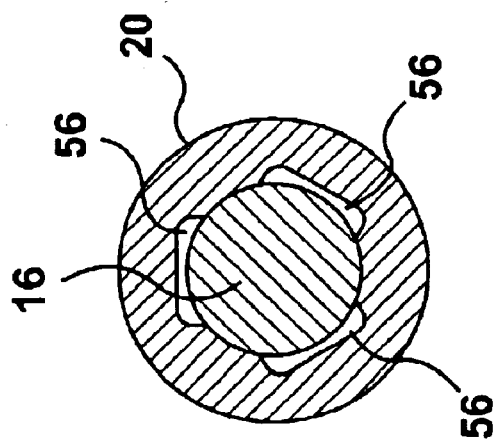
FIG. 3b is a cross-sectional view of a plurality of cutouts that are optionally included on the valve pin guide shown in FIG. 2.
Figure 3A:
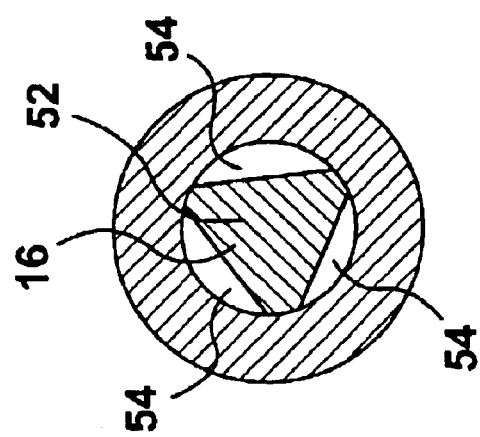
FIG. 3a is a cross-section view of a plurality of cutouts that are optionally included on a portion of the valve pin shown in FIG. 2.

Optionally, the valve pin 16 may have a pressure relief portion 52, which is a portion just aft of the tip 37, which has a plurality of cutouts 54, which are shown more clearly in the cross-sectional view in FIG. 3a. Cutouts 54 permit melt to backflow past the valve pin guide 20 when the valve pin 16 is closing the gate 34. This backflow is caused by the valve pin 16 itself, as the pressure relief portion 52 and tip 37 move forward and occupy space in the guide aperture 21b that was formerly occupied by melt. Alternatively, the pressure relief portion 52 may have only one cutout 54 to permit the backflow of melt during closing of the gate 34. The cutouts 54 may extend along a sufficient length of the valve pin 16, to permit the backflow of melt past the valve pin guide 20, and past the outlet 30 of the nozzle 14.

As another alternative, the pressure relief portion 52 of the valve pin 16 may be cylindrical and free of cutouts, and the valve pin guide 20 may have cutouts 56, to permit the backflow of melt, as shown in FIG. 3b. As a further alternative, the nozzle tip 27 may have cutouts 58 (see FIG. 3c), which are similar to the cutouts 56, and which function together with the cutouts 56 in the valve pin guide 20 to permit backflow of melt past the valve pin guide 20 and past the outlet 30 of the nozzle 14.

As another alternative, the diameters of the pressure relief portion 52 of the valve pin 16 may be sized so that suitable clearances exist between the pressure relief portion 52 and the outlet 30 of the nozzle 14, and between the pressure relief portion 52 and the valve pin guide 20, so that melt is permitted to backflow therepast as necessary. The applicant makes reference to PCT publication WO 01/78961 (Mold Masters Limited et al.), which describes cutouts and clearances and is hereby incorporated by reference.

Figure 4:
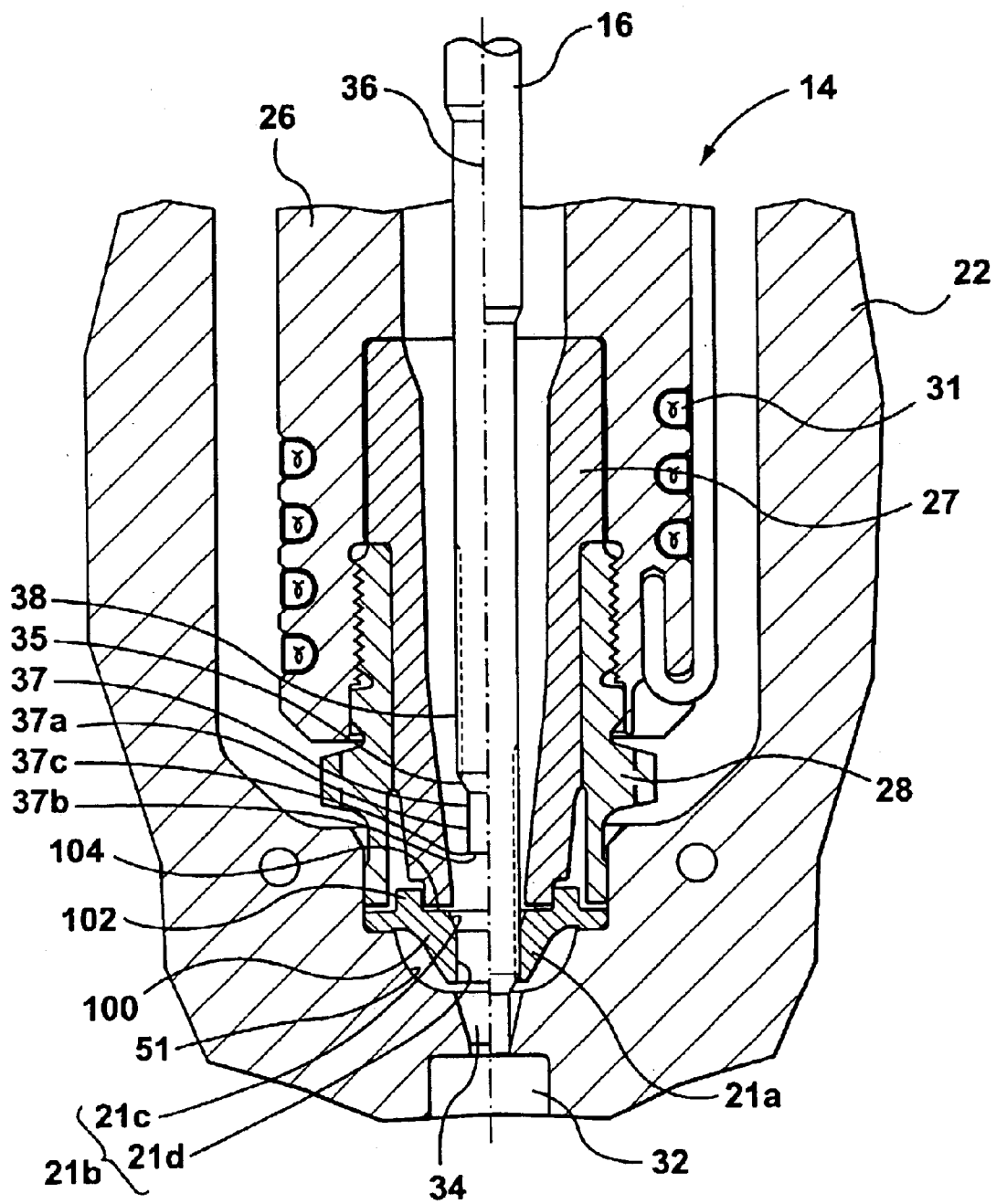
FIG. 4 is a sectional side view of a valve pin guide in accordance with another embodiment of the present invention.
Figure 4A:
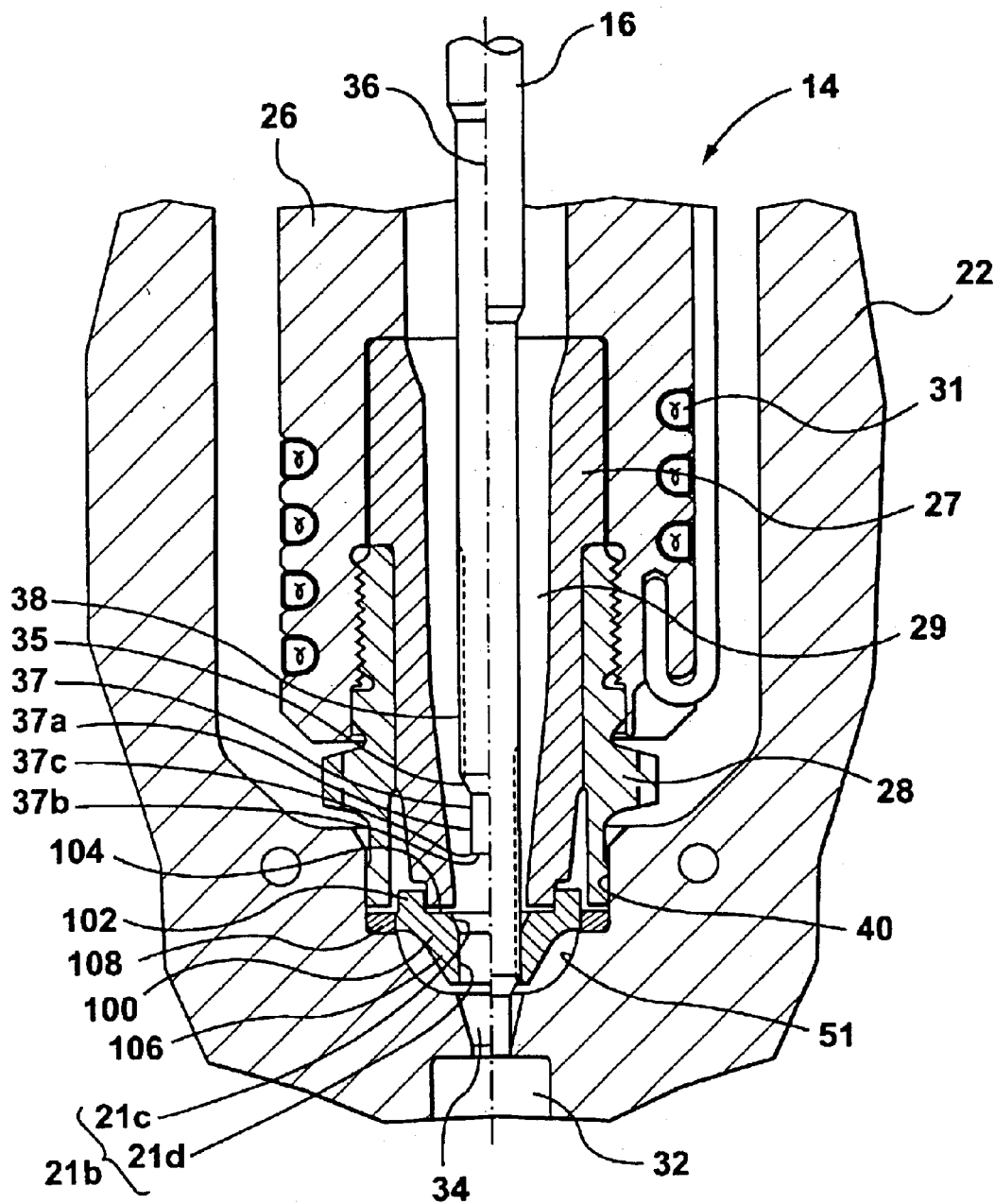
FIG. 4a is a sectional side view of a variant of the valve pin guide shown in FIG. 4.

Reference is made to FIG. 4, which shows a valve pin guide 100 in accordance with a second embodiment of the present invention. Valve pin guide 100 is similar to valve pin guide 20, (FIG. 2) except that valve pin guide 100 includes a lip 102 that extends from its upper surface which is shown at 104. The lip 102 slidably mates with a vertical wall of the nozzle tip 27, facilitating heat transfer between the tip 27 and the valve pin guide 100. The heat transfer permits the valve pin guide 100 to heat melt flowing through the guide aperture 21b. By configuring lip 102 to mate slidably with a vertical wall of the nozzle tip 27, the nozzle tip 27 is permitted to move towards the valve pin guide 100 during thermal expansion of the nozzle 14 when the nozzle 14 is heated.

In this embodiment, the valve pin guide 100 may be made from a thermally conductive material, such as steel or Tungsten Carbide, in order to transfer heat from the tip 27 to the melt in the guide aperture 21b. Alternatively, as shown in FIG. 16a, the valve pin guide 100 may be made from two materials, whereby the valve pin guide 100 comprises a guiding portion 106 made from a thermally conductive material, such as steel or Tungsten Carbide, and an insulating portion 108 made from a thermally insulative material to reduce heat lost to the mold cavity block 22. The guiding portion 106 defines the guide aperture 21b and the lip 102, and the insulating portion 108 contacts the mold cavity block 22, to reduce the amount of heat transferred from the guide 20 into the mold cavity block 22.

Figure 5:
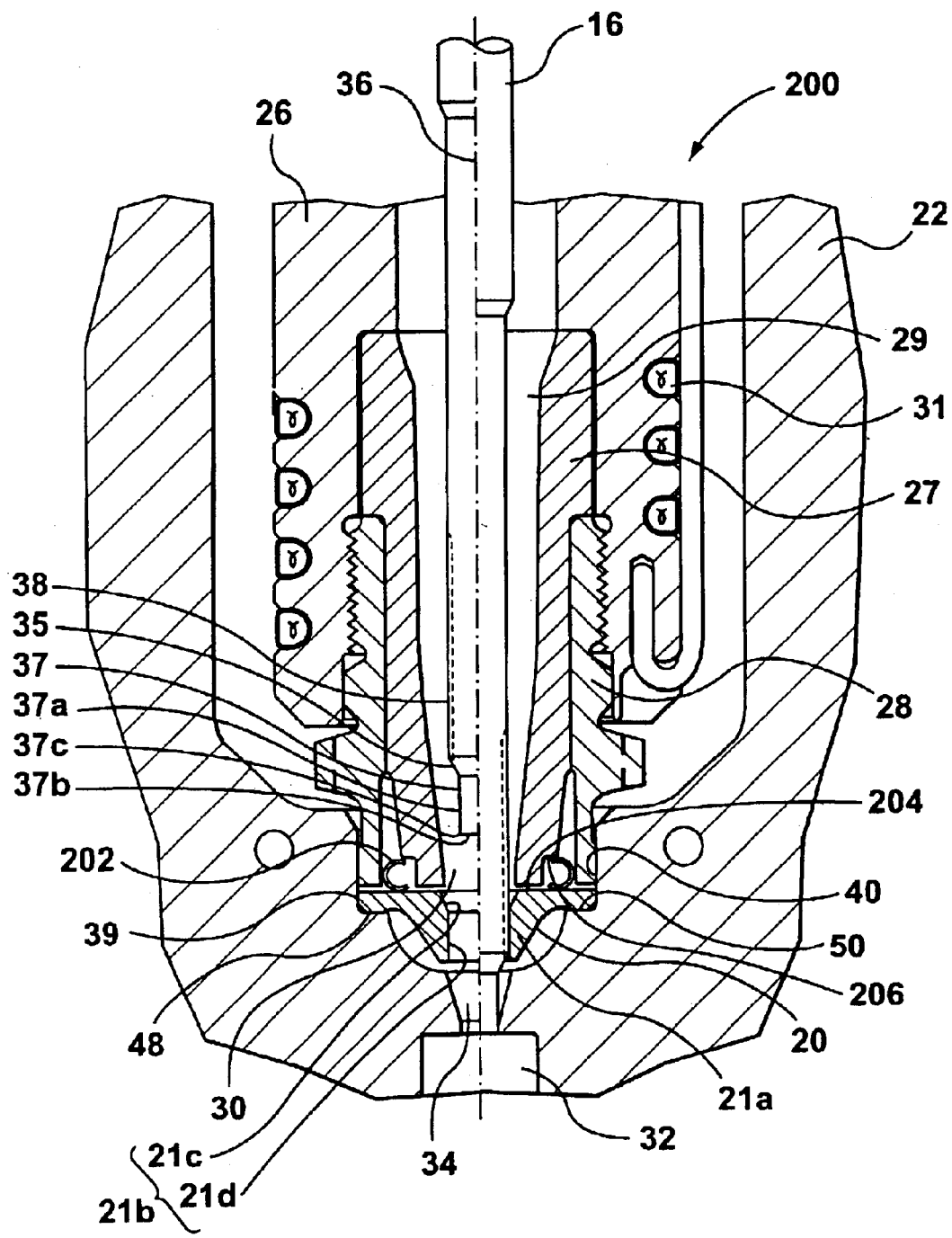
FIG. 5 is a sectional side view of a combination of the valve pin guide shown in FIG. 2, with a variant of the nozzle shown in FIG. 2, in accordance with yet another embodiment of the present invention.

Reference is made to FIG. 5, which shows a combination of the valve pin guide 20 and a hold-down spring 202, in accordance with a third embodiment of the present invention. The hold-down spring 202 is positioned between the upper surface of the valve pin guide 20, which is shown at 204 and a shoulder 206 on the tip 27, or on any other suitable portion of the nozzle 14. Even during portions of the molding cycle when the nozzle 14 is cooler, and is therefore spaced relatively far from the valve pin guide 20, the hold-down spring 202 remains under compression and maintains a hold-down force on the valve pin guide 20, to ensure that valve pin guide 20 is held in place in the first bore 40 against shoulder 50. During portions of the molding cycle when the nozzle 14 is hotter, and has thermally expanded downwards towards the valve pin guide 20, the hold-down spring 202 flexes to account for the change in length of the nozzle 14, and continues to apply a hold-down force on the valve pin guide 20.

The hold-down spring 202 may be any suitable type of spring, such as, for example, a metallic C-ring, as shown in FIG. 4. The metallic C-ring has a C-shaped cross-section, for improved flexibility relative to a metallic O-ring. Any material may be used for the C-ring depending on the environment in the molding operation.

Figure 6:
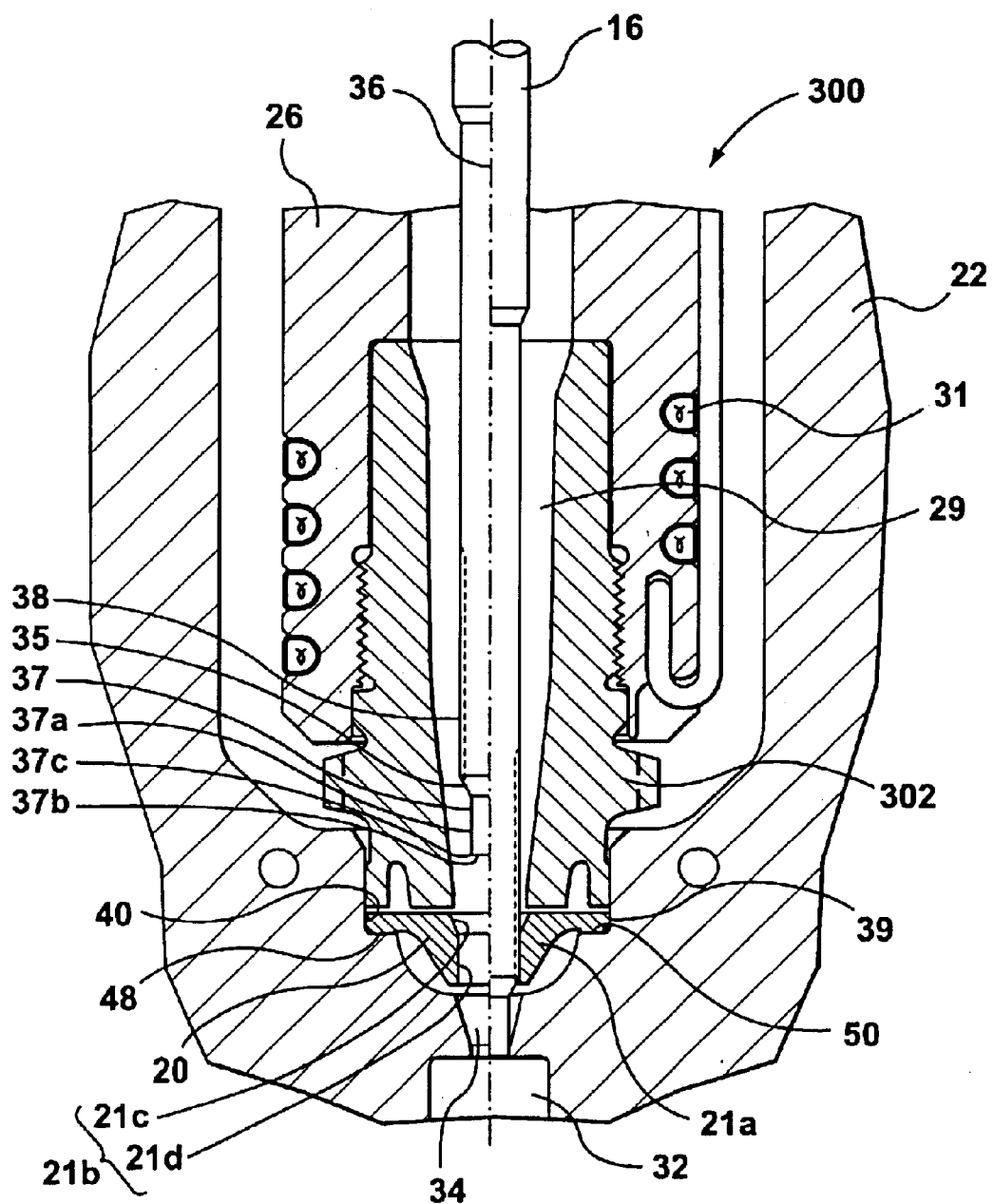
FIG. 6 is a sectional side view of a combination of the valve pin guide shown in FIG. 2, with another variant of the nozzle shown in FIG. 2, in accordance with yet another embodiment of the present invention.

Reference is made to FIG. 6, which shows the valve pin guide 20 positioned between a nozzle 300 and mold cavity block 22. Nozzle 300 is similar to nozzle 14 (FIG. 2), except that nozzle 300 has a tip 302 that mounts into the nozzle body 26 without the use of a tip retainer. For example, the tip 302 may be threaded, and may mate with a threaded portion in the nozzle body 26.

Figure 7:
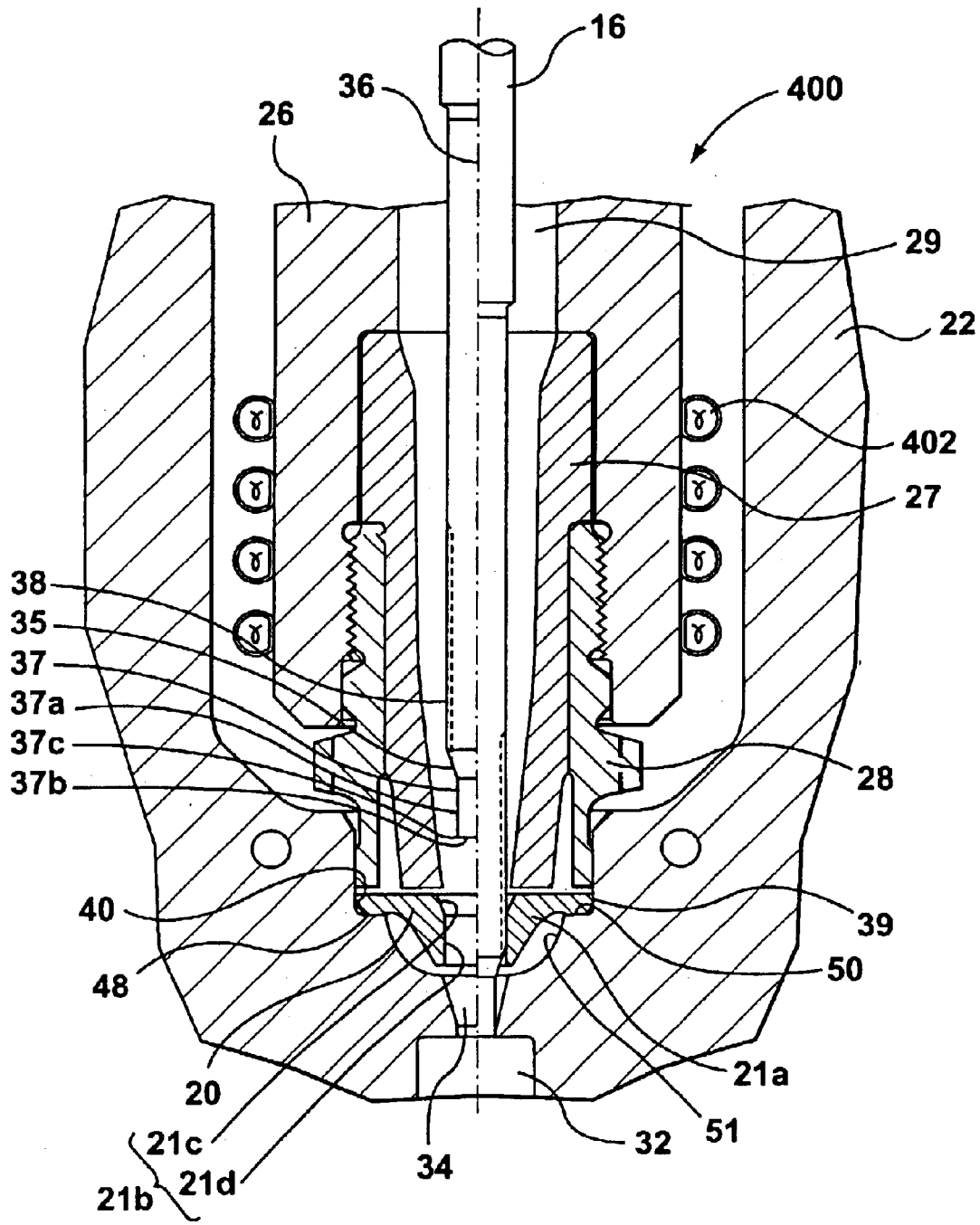
FIG. 7 is a sectional side view of a combination of the valve pin guide shown in FIG. 2 with yet another variant of the nozzle shown in FIG. 2, in accordance with yet another embodiment of the present invention.

Reference is made to FIG. 7, which shows the valve pin guide 20 positioned between a nozzle 400 and mold cavity block 22. Nozzle 400 is similar to nozzle 14, except that nozzle 400 includes a nozzle heater 402 that is wrapped outside the nozzle body 26, instead of being embedded within the exterior surface of the nozzle body 26.

Figure 8:
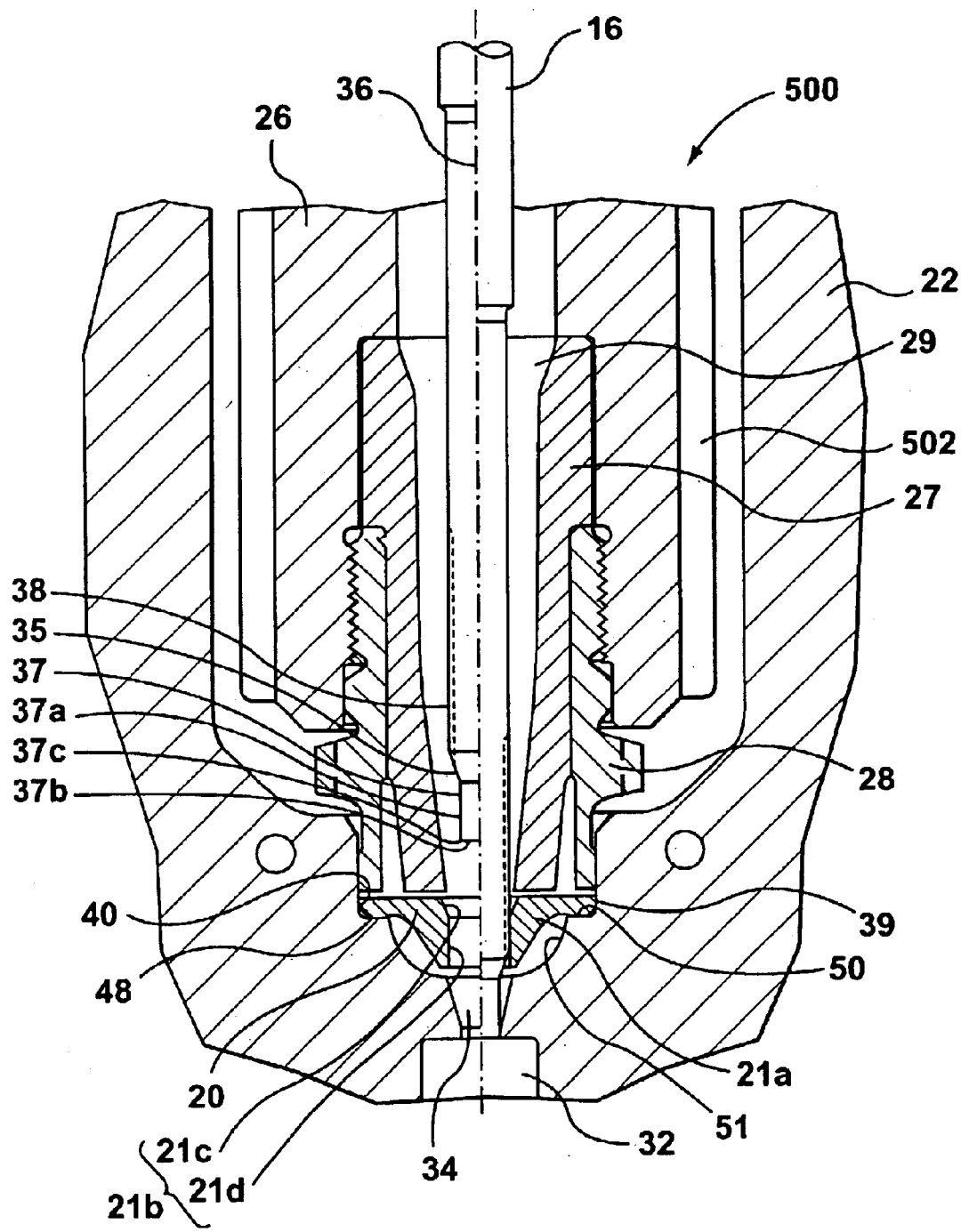
FIG. 8 is a sectional side view of a combination of the valve pin guide shown in FIG. 2 with yet another variant of the nozzle shown in FIG. 2, in accordance with yet another embodiment of the present invention.

Reference is made to FIG. 8, which shows the valve pin guide 20 positioned between a nozzle 500 and mold cavity block 22. Nozzle 500 is similar to nozzle 14, except that nozzle 500 includes a nozzle heater 502 that is a band heater, instead of a wrapped wire heater (FIG. 2).

Figure 9:
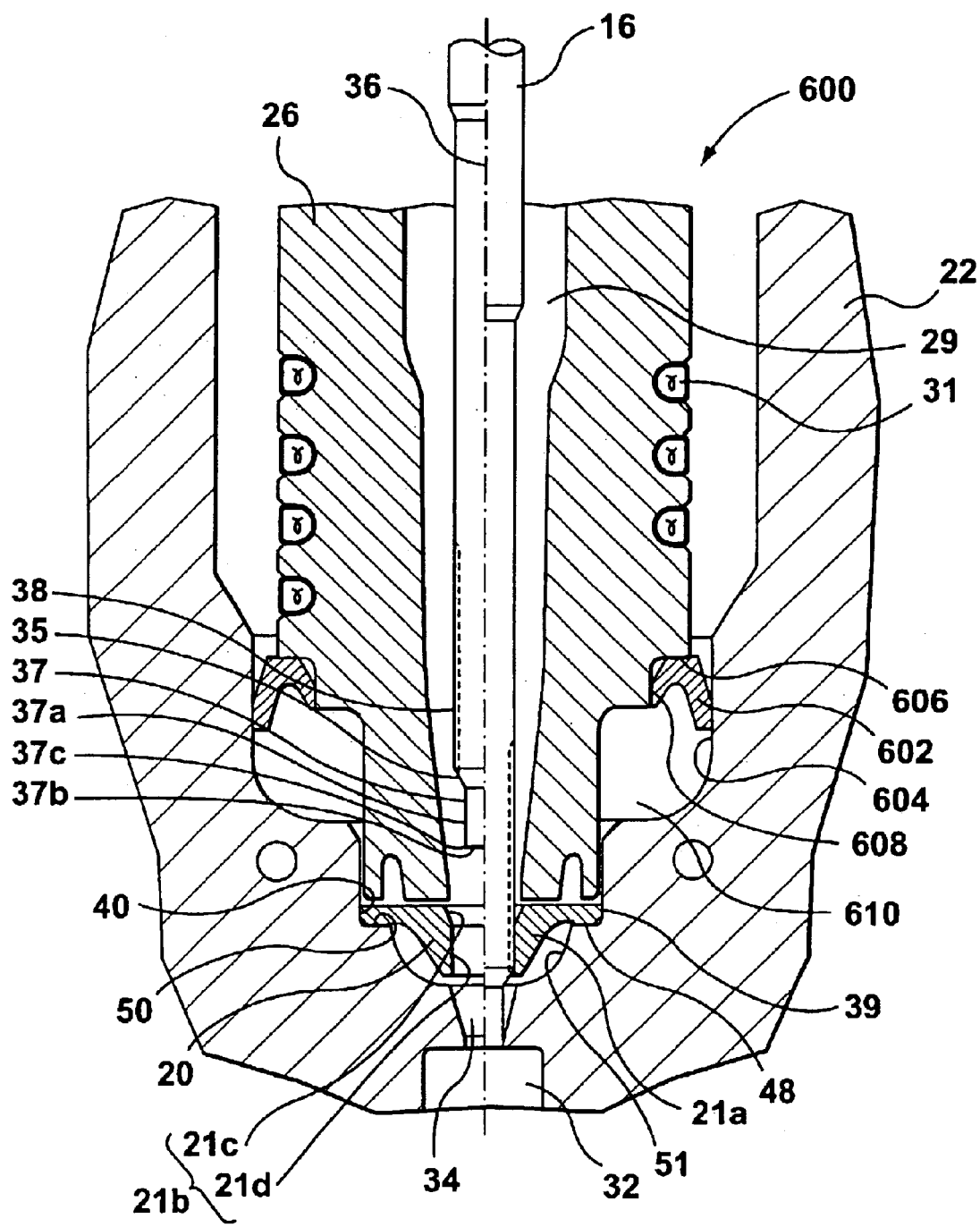
FIG. 9 is a sectional side view of a combination of the valve pin guide shown in FIG. 2 with yet another variant of the nozzle shown in FIG. 2, in accordance with yet another embodiment of the present invention.

Reference is made to FIG. 9, which shows the valve pin guide 20 positioned between a nozzle 600 and mold cavity block 22. Nozzle 600 is similar to nozzle 14 (FIG. 2), except that nozzle 600 has a tip that is integral with a nozzle body. The nozzle 600 also includes a separate alignment and seal piece 602. The alignment and seal piece 602 mates with a bore 604, and mates with a shoulder 606 and a vertical portion 608 of the exterior surface of the nozzle 600 to align the nozzle 600 relative to the gate 34, and to seal against melt leakage. In this embodiment, melt is permitted to fill a chamber 610 that is defined by the exterior surface of the nozzle 600, the mold cavity block 22 and the seal piece 602. By filling the chamber 610 with melt, the melt acts as a thermal insulator between the mold cavity block 22 and the nozzle 600.

Figure 10:
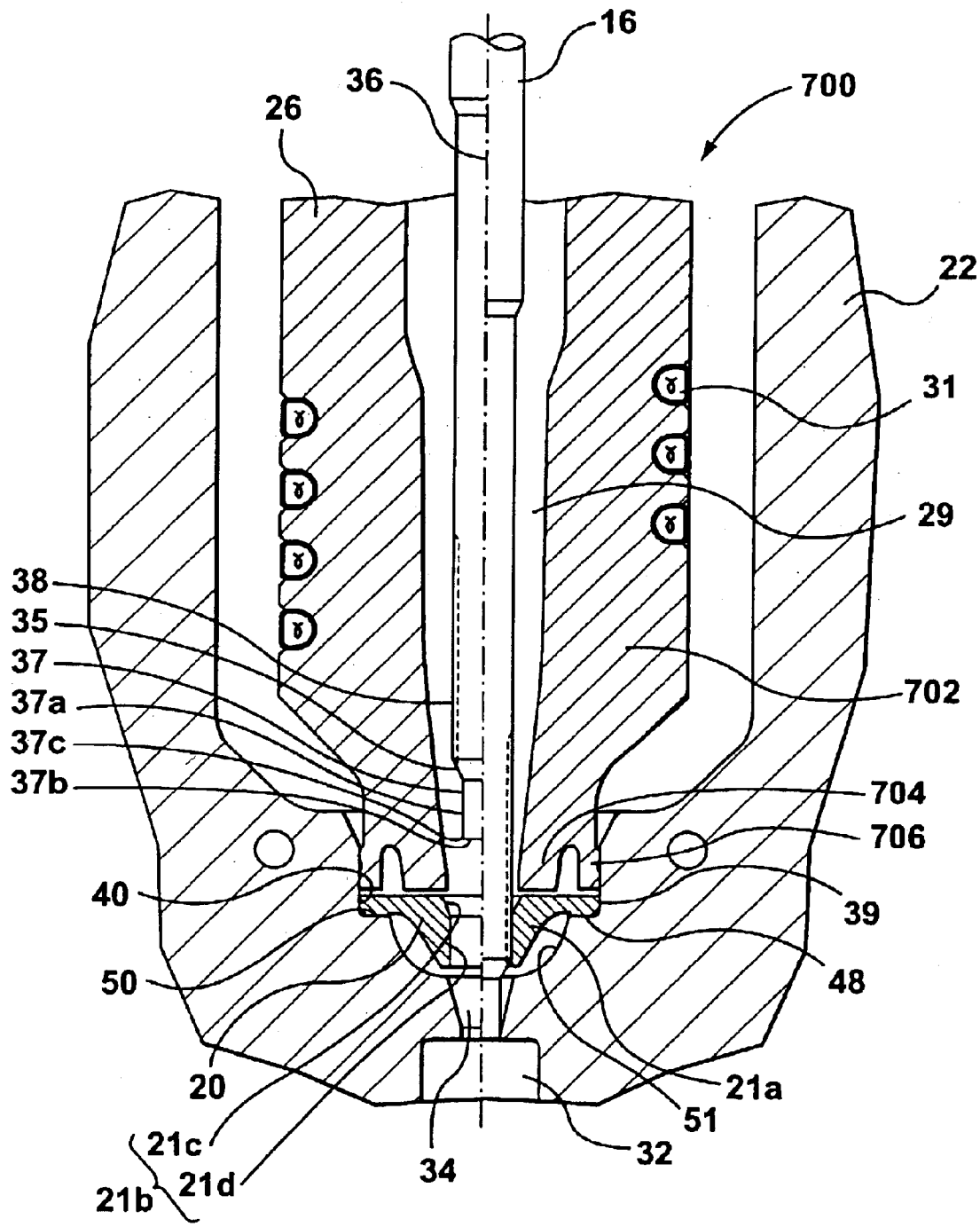
FIG. 10 is a sectional side view of a combination of the valve pin guide shown in FIG. 2 with yet another variant of the nozzle shown in FIG. 2, in accordance with yet another embodiment of the present invention.

Reference is made to FIG. 10, which shows the valve pin guide 20 positioned between a nozzle 700 and mold cavity block 22. Nozzle 700 is similar to nozzle 14, except that nozzle 700 is a one-piece configuration, which has a body 702, a tip 704 and a sealing and alignment portion 706 that are all integrally joined together. In this embodiment, the sealing and alignment portion 706 is positioned in the first bore 40.

Figure 11:
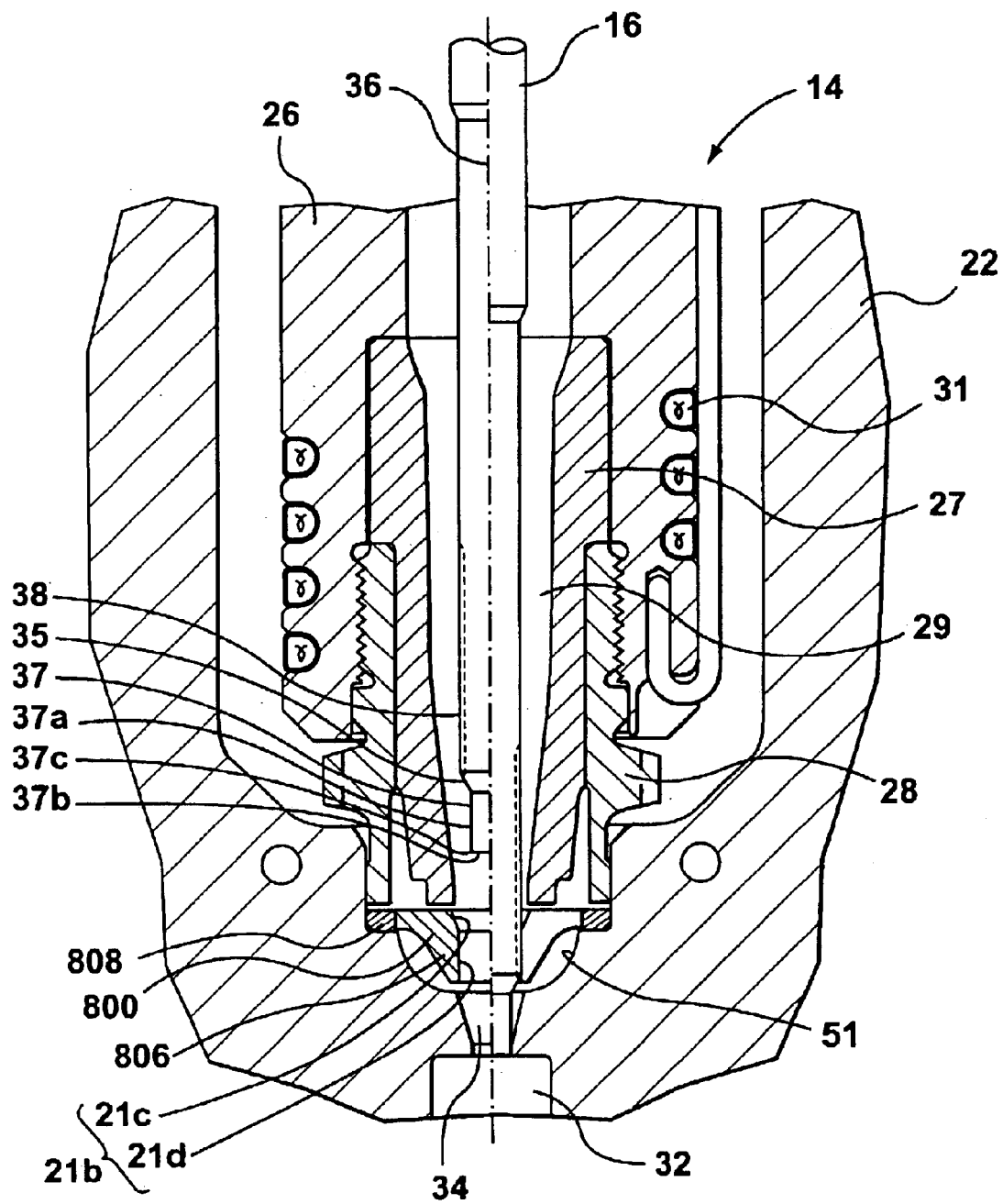
FIG. 11 is a sectional side view of a combination of the valve pin guide shown in FIG. 2 with yet another variant of the nozzle shown in FIG. 2, in accordance with yet another embodiment of the present invention.

Reference is made to FIG. 11, which shows a valve pin guide 800 in accordance with another embodiment of the present invention. Valve pin guide 800 is similar to valve pin guide 20 (FIG. 2), except that valve pin guide 800 includes an inner piece 806 and an outer piece 808. The inner piece 806 includes the portion defining the guide aperture 21b, and the outer piece 808 includes the portion contacting the mold cavity block 22. The inner piece 806 may have a first selected mechanical or thermal property, and the outer piece 808 may have a second selected mechanical or thermal property. For example, the inner piece 806 may be made from a wear resistant material, such as Tungsten Carbide to resist wear from melt flowing therethrough and from contact with the valve pin 16, and the outer piece 808 may be made from any suitable thermally insulative material, such as Vespel™, to reduce heat losses to the mold cavity block 22. Any suitable combination of mechanical and thermal properties can be selected for the inner and outer pieces 806 and 808.

Figure 12:
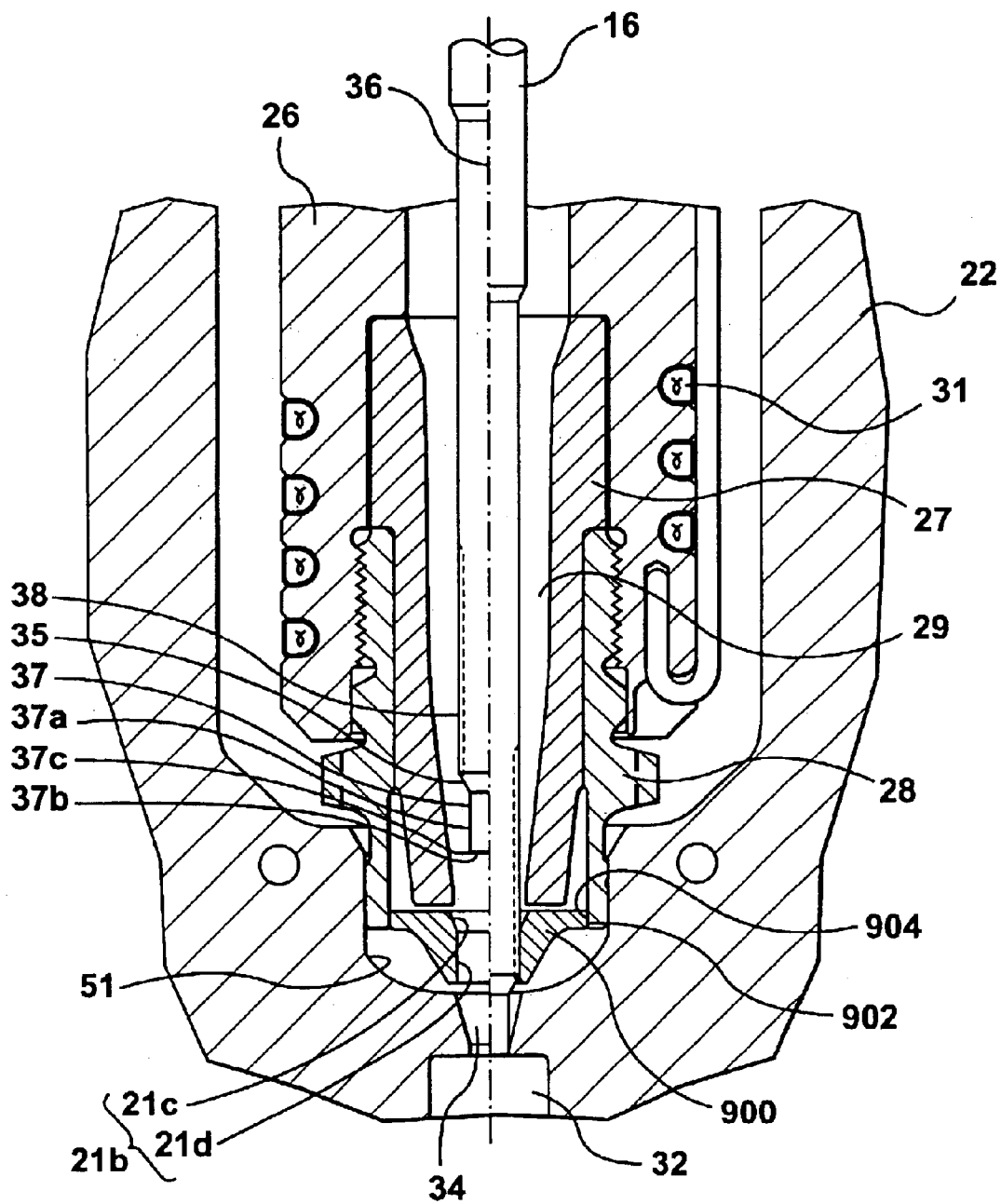
FIG. 12 is a sectional side view of a combination of the valve pin guide shown in FIG. 2 with yet another variant of the nozzle shown in FIG. 2, in accordance with yet another embodiment of the present invention.

Reference is made to FIG. 12, which shows a valve pin guide 900 in accordance with another embodiment of the present invention. The valve pin guide 900 is similar to the valve pin guide 20 (FIG. 2), except that the valve pin guide 900 does not require a sealing surface on its peripheral edge, which is shown at 902. The peripheral edge 902 may be an alignment edge, and mates with a portion of the tip retainer 28 on the nozzle 14. The portion of the tip retainer 28 may be, for example an inside surface of the tip retainer 28, shown at 904.

The valve pin guide 900 may be made from a thermally conductive material or a thermally insulative material, such as any material from which the tip 27 or the tip retainer 28 is made.

Figure 13:
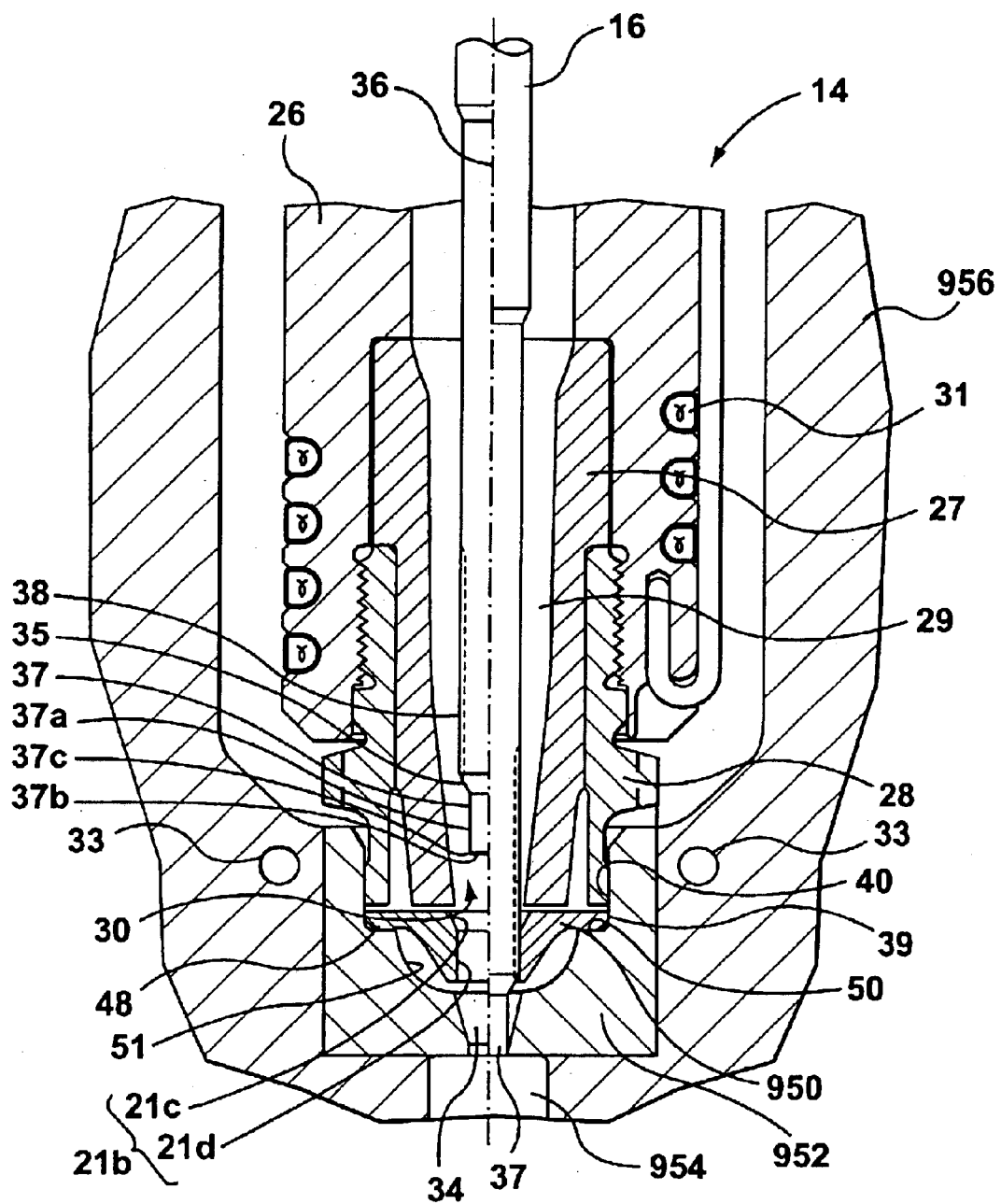
FIG. 13 is a sectional side view of a combination of the valve pin guide shown in FIG. 2 with a variant of the mold cavity block shown in FIG. 2, in accordance with yet another embodiment of the present invention.

Reference is made to FIG. 13, which shows a valve pin guide 950 upstream from a gate insert 952. The gate insert 952 has the gate 34 therein and defines at least a portion of a mold cavity 954. For that reason, portions of the gate insert 952 may have to be machined and surfaced to stricter tolerances than is required for the valve pin guide 950. Furthermore, the gate insert 952 may have to be fitted and positioned very carefully with respect to surrounding molding apparatus components, eg. a mold plate 956, so that the joint therebetween does not leave a mark on the molded parts (not shown). It can be easier and less expensive to replace the valve pin guide 950 than it is to replace the gate insert 952.

Reference has been made to the use of a valve pin guide in accordance with the present invention, with a mold cavity block having a gate directly therein and a mold cavity block having a gate insert with the gate therein. It will be appreciated that the valve pin guide of the present invention may also be used with any other suitable gate-containing component, such as a transfer seal.

Figure 14:
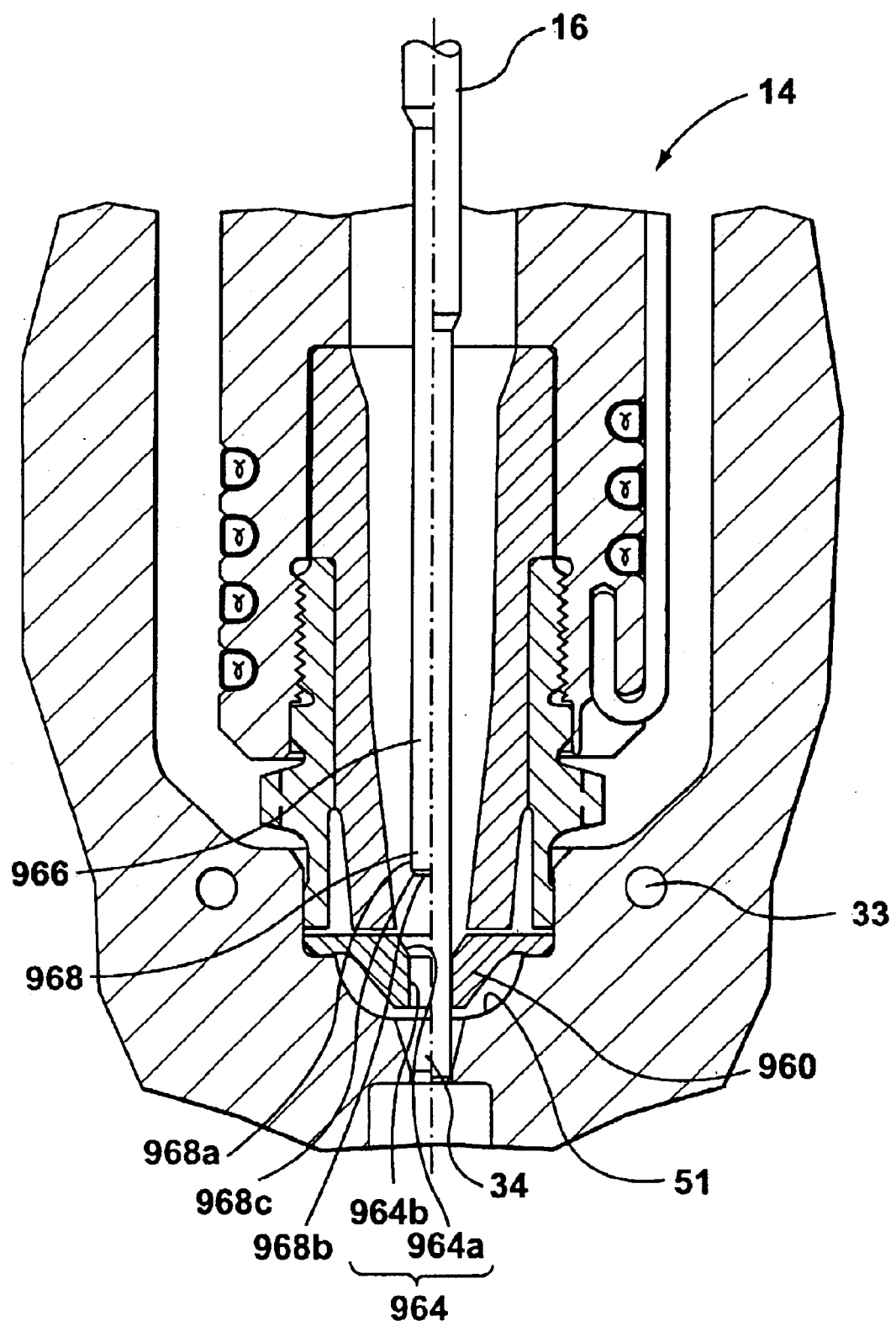
FIG. 14 is a sectional side view of a valve pin guide in accordance with yet another embodiment of the present invention, in combination with a variant of the valve pin shown in FIG. 2.

Reference is made to FIG. 14, which shows a valve pin guide 960 in combination with a valve pin 962, in accordance with another embodiment of the present invention. The valve pin guide 960 may be similar to any of the valve pin guides described herein, except that the valve pin guide 960 has a guide aperture 964 instead of the guide aperture 21b (FIG. 2). Unlike the guide aperture 21b (FIG. 2), which has a larger diameter than that of the gate 34, the guide aperture 964 has the same diameter as the gate 34. The guide aperture 964 has an upstream portion 964a and a downstream portion 964b. The upstream portion 964a may be coned to facilitate guiding of the valve pin 16 into alignment with the gate 34. The downstream portion 964b may be cylindrical and may be adapted to cooperate with the guiding surface 38 on the valve pin 16.

The valve pin 962 may be similar to the valve pin 16 (FIG. 2), except that the valve pin 962 has a body 966 and a tip 968, which may have the same diameter. On the tip 968 is a sealing portion 968a, a bottom face 968b, and an edge 968c.

When the valve pin 962 is moved towards the gate 34, the tip 968 enters the guide aperture 964 and cooperates therewith to align the valve pin 962 with respect to the gate 34. Because the tip 968 both aligns the valve pin 962 with the gate 34 and seals with the gate 34, the guide aperture 964 has the same diameter as the gate 34. Also, because the tip 968 aligns and seals with the gate 34, the edge 968c is preferably chamfered.

As a further consequence of the tip 968c both aligning and sealing with the gate 34, the tip 968c will incur wear and will require eventual replacement. The gate 34 remains protected from damage due to the presence of the valve pin guide 960, however.

By providing a valve pin guide in accordance with the present invention, the wear that would otherwise occur in the gate. Furthermore, by making the valve pin guide separate from the gate-containing component and separate from the nozzle, the valve pin guide can be replaced without requiring the replacement of either of those components.

Having the valve pin guide be aligned separately from the nozzle eliminates a potential source of inaccuracy in the alignment of the valve pin guide with respect to the gate, namely manufacturing errors and tolerances in the nozzle. This, in-turn, reduces the need to 'custom-make' the mold cavity block to suit the errors in each nozzle's manufacture.

Furthermore, the nozzles can be subject to thermal expansion during an injection molding cycle and can move laterally by an unspecified amount during the expansion. The valve pin guide can correct any misalignments due to this lateral movement to ensure that the valve pin does not damage the gate of the mold cavity.

Reference has been made in the above embodiments to diameters in relation to several components and parts thereof, such as, valve pins, valve pin guides, and gates. It will be appreciated that the shapes of these components do not by necessity have to be cylindrical or circular as the case may be. These components may have other shapes and still fall within the scope of the invention.

It will be appreciated that the injection molding apparatus 10 may be any type of injection molding apparatus, such as, for example, a single cavity machine, a multi-cavity machine (as shown), a co-injection machine, or a stack-mold machine.

While the above description constitutes the preferred embodiments, it will be appreciated that the present invention is susceptible to modification and change without departing from the fair meaning of the accompanying claims.

What is claim is:

1. A valve pin guide positioned downstream from a nozzle for receiving and guiding a valve pin into a gate for a mold cavity in an injection molding apparatus, the valve pin guide comprising:
    a guiding portion in which a guide aperture is defined therethrough, wherein said guiding portion is made from a guiding portion material having a first thermal conductivity and said guiding portion is adapted to contact the nozzle; and
    an insulating portion, wherein said insulating portion is made from an insulating portion material having a second thermal conductivity, wherein said second thermal conductivity is lower than said first thermal conductivity and said insulating portion is adapted to contact a mold cavity block.

2. The valve pin guide as claimed in claim 1, wherein the gate is defined in a mold component, and said valve pin guide has a sealing surface, wherein said sealing surface is adapted to cooperate with the mold component to seal against melt leakage around the gate.

3. The valve pin guide as claimed in claim 1, wherein said valve pin guide is removably positionable downstream from the nozzle and upstream from the gate.

4. The valve pin guide as claimed in claim 1, wherein said valve pin guide is adapted to slidably contact the nozzle, to accommodate thermal expansion and contraction of the nozzle during an injection molding operation.

5. The valve pin guide as claimed in claim 1, wherein the nozzle has a nozzle tip that is made from a nozzle tip material having a thermal conductivity that is less than said first thermal conductivity of said guiding portion of said valve pin guide.

6. An injection molding apparatus, comprising:
    at least one nozzle having a nozzle melt passage therethrough for receiving a melt from a melt source;
    a nozzle tip secured to a downstream end of said nozzle by a nozzle tip retainer, wherein said nozzle tip receives the melt from said nozzle melt passage;
    a mold cavity block defining at least one mold cavity and a gate into said at least one mold cavity, wherein said gate is positioned downstream from said nozzle tip;
    a valve pin, wherein said valve pin is movable in said nozzle tip and said nozzle melt passage to open and close said gate; and
    a valve pin guide positioned downstream from said nozzle tip and upstream from said gate, wherein said valve pin guide defines a guide aperture therethrough that is adapted to receive and guide said valve pin into alignment with said gate.

7. The injection molding apparatus as claimed in claim 6, wherein said valve pin guide is in contact with said mold cavity block.

8. The injection molding apparatus as claimed in claim 6, wherein said valve pin guide is connected to said mold cavity block.

9. The injection molding apparatus as claimed in claim 6, wherein said valve pin guide is removably connected to said mold cavity block.

10. The injection molding apparatus as claimed in claim 6, wherein said valve pin is movable to an open position to permit melt flow into said mold cavity, and wherein in said open position said valve pin is spaced from said guide aperture.

11. The injection molding apparatus as claimed in claim 6, wherein said valve pin has a sealing surface, wherein said sealing surface is adapted to form a seal with said gate to prevent melt flow therebetween, and said valve pin has a guide surface, wherein said guide surface is adapted to cooperate with said guide aperture on said valve pin guide to align said valve pin with said gate prior to said sealing surface contacting said gate.

12. The injection molding apparatus as claimed in claim 11, wherein said sealing surface on said valve pin is a separate surface from said guide surface.

13. The injection molding apparatus as claimed in claim 6, wherein said gate is defined in a separate gate insert component from said surrounding portion of said mold cavity block.

14. The injection molding apparatus as claimed in claim 6, wherein said nozzle tip is made from a nozzle tip material having a first thermal conductivity, and said valve pin guide is made from a valve pin guide material having a second thermal conductivity and said second thermal conductivity is less than said first thermal conductivity.

15. The injection molding apparatus as claimed in claim 14, wherein said nozzle has a nozzle body and said nozzle tip is attached to said nozzle body.

16. The injection molding apparatus as claimed in claim 6, wherein said valve pin guide has a sealing surface, that is adapted to cooperate with said mold cavity block to seal against melt leakage around said gate.

17. The injection molding apparatus as claimed in claim 6, wherein said valve pin guide is adapted to slidably contact said nozzle to accommodate thermal expansion and contraction of said nozzle during an injection molding operation.

18. The injection molding apparatus as claimed in claim 6, wherein said valve pin guide comprises,
a guiding portion in which said guide aperture is defined, wherein said guiding portion is made from a guiding portion material having a first thermal conductivity, said guiding portion is adapted to contact said nozzle, and
an insulating portion, wherein said insulating portion is made from an insulating portion material having a second thermal conductivity, wherein said second thermal conductivity is lower than said first thermal conductivity and wherein said insulating portion is adapted to contact said mold cavity block.

19. The injection molding apparatus as claimed in claim 18, wherein said valve pin guide is adapted to slidably contact said nozzle, to accommodate thermal expansion and contraction of said nozzle during an injection molding operation.

20. The injection molding apparatus as claimed in claim 6, further comprising: a resilient member that is positioned between said nozzle and said valve pin guide.

21. The injection molding apparatus as claimed in claim 6, wherein said valve pin guide is attached to said nozzle.

22. An injection molding apparatus, comprising:
a mold cavity block, wherein said mold cavity block defines a mold cavity therein, said mold cavity has a gate, wherein said mold cavity block has a first bore and a second bore, wherein said gate is positioned in said second bore and wherein said first bore is larger in diameter than said second bore;
an injection nozzle having a nozzle tip secured thereto by a tip retainer, wherein a melt channel is defined in said injection nozzle and said nozzle tip to convey melt towards said gate;
a valve pin, wherein said valve pin is positioned at least partially in said melt channel and is movable to control melt flow into said gate; and
a valve pin guide, wherein said valve pin guide is adapted to receive and guide said valve pin into alignment with said gate, and wherein said valve pin guide is positioned in said first bore downstream from said nozzle tip.

23. The injection molding apparatus according to claim 22, wherein said second bore is in fluid communication with said melt channel so that said second bore substantially fills with melt during an injection molding operation.

24. The injection molding apparatus according to claim 22, wherein a shoulder separates said first and second bores and said valve pin guide is adapted to seal against said shoulder.

25. The injection molding apparatus according to claim 22, wherein said nozzle includes a sealing surface that is adapted to cooperate with said first bore to inhibit melt leakage therebetween.

* * * * *

UNITED STATES PATENT AND TRADEMARK OFFICE
CERTIFICATE OF CORRECTION

PATENT NO.     : 6,921,259 B2
DATED          : July 26, 2005
INVENTOR(S)    : Sicilia et al.

It is certified that error appears in the above-identified patent and that said Letters Patent is hereby corrected as shown below:

Column 13,
Line 48, please add the word -- tip -- after the word "nozzle.".

Column 14,
Lines 2, 12 and 17, please add the word -- tip -- after the word "nozzle.".
Line 19, please add the words -- tip retainer -- after the word "nozzle.".

Signed and Sealed this

Twenty-ninth Day of November, 2005

JON W. DUDAS
*Director of the United States Patent and Trademark Office*